United States Patent
Vook et al.

(10) Patent No.: US 9,876,548 B2
(45) Date of Patent: Jan. 23, 2018

(54) METHOD AND APPARATUS FOR FLEXIBLE PRODUCT CODEBOOK SIGNALING

(71) Applicant: Nokia Solutions and Networks Oy, Espoo (FI)

(72) Inventors: Frederick Vook, Shaumburg, IL (US); Timothy Thomas, Palatine, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/121,185

(22) PCT Filed: Feb. 27, 2014

(86) PCT No.: PCT/US2014/019064
§ 371 (c)(1),
(2) Date: Aug. 24, 2016

(87) PCT Pub. No.: WO2015/130292
PCT Pub. Date: Sep. 3, 2015

(65) Prior Publication Data
US 2017/0019159 A1    Jan. 19, 2017

(51) Int. Cl.
*H04B 7/04*    (2017.01)
*H04L 25/03*    (2006.01)

(52) U.S. Cl.
CPC ..... *H04B 7/0478* (2013.01); *H04L 25/03898* (2013.01); *H04L 25/03942* (2013.01)

(58) Field of Classification Search
CPC ............ H04B 7/0478; H04L 25/03898; H04L 25/03942
See application file for complete search history.

(56) References Cited

U.S. PATENT DOCUMENTS

| | | | |
|---|---|---|---|
| 2008/0192717 A1* | 8/2008 | Kent ................... | H04B 7/0417 370/342 |
| 2013/0230081 A1 | 9/2013 | Wernersson et al. | |
| 2013/0259151 A1 | 10/2013 | Thomas et al. | |
| 2013/0265899 A1 | 10/2013 | Sayana et al. | |
| 2014/0098689 A1* | 4/2014 | Lee ..................... | H04B 7/0469 370/252 |
| 2014/0177744 A1* | 6/2014 | Krishnamurthy .... | H04B 7/0469 375/267 |
| 2015/0326300 A1* | 11/2015 | Fujii ...................... | H04L 1/06 375/346 |

OTHER PUBLICATIONS

International Search Report and Written Opinion received for corresponding Patent Cooperation Treaty Application No. PCT/US2014/19064, dated Jun. 20, 2014, 8 pages.

* cited by examiner

*Primary Examiner* — David B. Lugo
(74) *Attorney, Agent, or Firm* — Nokia Solutions and Networks Oy

(57) ABSTRACT

A method and apparatus can be configured to transmit a number of azimuth antenna elements. The method can also comprise transmitting a number of elevation antenna elements. The method can also comprise receiving an azimuth precoder-matrix-indicator. The method can also comprise receiving an elevation precoder-matrix-indicator. The method can also comprise transmitting based on the received azimuth precoder-matrix-indicator and the received elevation precoder-matrix-indicator.

16 Claims, 21 Drawing Sheets

METHOD AND APPARATUS FOR FLEXIBLE PRODUCT CODEBOOK SIGNALING

RELATED APPLICATION

This application was originally filed as Patent Cooperation Treaty Application No. PCT/US2014/019064 filed Feb. 27, 2014.

BACKGROUND

Field

Embodiments of the invention relate to performing flexible-product-codebook signaling.

Description of the Related Art

Long-term Evolution (LTE) is a standard for wireless communication that seeks to provide improved speed and capacity for wireless communications by using new modulation/signal processing techniques. The standard was proposed by the 3$^{rd}$ Generation Partnership Project (3GPP), and is based upon previous network technologies. Since its inception, LTE has seen extensive deployment in a wide variety of contexts involving the communication of data.

SUMMARY

According to a first embodiment, a method comprises transmitting, by a network entity, a number of azimuth antenna elements. The method also comprises transmitting a number of elevation antenna elements. The method also comprises receiving an azimuth precoder-matrix-indicator. The method also comprises receiving an elevation precoder-matrix-indicator. The method also comprises transmitting based on the received azimuth precoder-matrix-indicator and the received elevation precoder-matrix-indicator.

In the method of the first embodiment, the network entity may comprise one of an evolved-Node-B, a base station, a relay station, and an access point.

In the method of the first embodiment, the receiving the azimuth precoder-matrix-indicator may comprise receiving an azimuth precoder-matrix-indicator based on an azimuth codebook, the receiving the elevation precoder-matrix-indicator may comprise receiving an elevation precoder-matrix-indicator based on an elevation codebook, the azimuth codebook may be based on the number of azimuth antenna elements, and the elevation codebook may be based on the number of elevation antenna elements.

In the method of the first embodiment, the azimuth codebook may be further based on a first step size, and the elevation codebook may be further based on a second step size.

In the method of the first embodiment, the method may further comprise transmitting an array type. The azimuth codebook and the elevation codebook may be based on the array type.

In the method of the first embodiment, the azimuth codebook may be based on discrete-fourier-transform vectors of a dimension specified by the transmitted number of azimuth antenna elements and based on the first step size.

In the method of the first embodiment, the method may further comprise transmitting a cross-polarization type.

In the method of the first embodiment, the azimuth codebook may be based on a combination of a two-element codebook and discrete-fourier-transform vectors having a dimension based on the transmitted number of azimuth antenna elements.

In the method of the first embodiment, the elevation codebook may be based on discrete-fourier transform vectors having a dimension based on a number of elevation antenna elements and based on the second step size.

In the method of the first embodiment, the elevation codebook may be based on a combination of a two-element codebook and discrete-fourier-transform vectors having a dimension based on the transmitted number of elevation antenna elements.

According to a second embodiment, an apparatus comprises at least one processor. The apparatus also comprises at least one memory comprising computer program code. The at least one memory and the computer program code can be configured, with the at least one processor, to cause the apparatus at least to transmit a number of azimuth antenna elements. The apparatus can also be caused to transmit a number of elevation antenna elements. The apparatus can also be caused to receive an azimuth precoder-matrix-indicator. The apparatus can also be caused to receive an elevation precoder-matrix-indicator. The apparatus can also be caused to transmit based on the received azimuth precoder-matrix-indicator and the received elevation precoder-matrix-indicator.

In the apparatus of the second embodiment, the apparatus may comprise one of an evolved-Node-B, a base station, a relay station, and an access point.

In the apparatus of the second embodiment, the receiving the azimuth precoder-matrix-indicator may comprise receiving an azimuth precoder-matrix-indicator based on an azimuth codebook, the receiving the elevation precoder-matrix-indicator may comprise receiving an elevation precoder-matrix-indicator based on an elevation codebook, the azimuth codebook may be based on the number of azimuth antenna elements, and the elevation codebook may be based on the number of elevation antenna elements.

In the apparatus of the second embodiment, the azimuth codebook may be further based on a first step size, and the elevation codebook may be further based on a second step size.

In the apparatus of the second embodiment, the apparatus may be further caused to transmit an array type, and the azimuth codebook and the elevation codebook are based on the array type.

In the apparatus of the second embodiment, the azimuth codebook may be based on discrete-fourier-transform vectors of a dimension specified by the transmitted number of azimuth antenna elements and based on the first step size.

In the apparatus of the second embodiment, the apparatus may be further caused to transmit a cross-polarization type.

In the apparatus of the second embodiment, the azimuth codebook may be based on a combination of a two-element codebook and discrete-fourier-transform vectors having a dimension based on the transmitted number of azimuth antenna elements.

In the apparatus of the second embodiment, the elevation codebook may be based on discrete-fourier transform vectors having a dimension based on a number of elevation antenna elements and based on the second step size.

In the apparatus of the second embodiment, the elevation codebook may be based on a combination of a two-element codebook and discrete-fourier-transform vectors having a dimension based on the transmitted number of elevation antenna elements.

According to a third embodiment, a computer program product can be embodied on a non-transitory computer readable medium. The computer program product can be configured to control a processor to perform a process comprising transmitting, by a network entity, a number of azimuth antenna elements. The process can also comprise transmitting a number of elevation antenna elements. The process can also comprise receiving an azimuth precoder-matrix-indicator. The process can also comprise receiving an elevation precoder-matrix-indicator. The process can also comprise transmitting based on the received azimuth precoder-matrix-indicator and the received elevation precoder-matrix-indicator.

According to a fourth embodiment, a method can comprise receiving, by a network element, a number of azimuth antenna elements. The method can also comprise receiving a number of elevation antenna elements. The method can also comprise transmitting an azimuth precoder-matrix-indicator. The method can also comprise transmitting an elevation precoder-matrix-indicator. The method can also comprise receiving transmissions based on the transmitted azimuth precoder-matrix-indicator and the transmitted elevation precoder-matrix-indicator.

In the method of the fourth embodiment, the network element can comprise one of a user equipment and a relay.

In the method of the fourth embodiment, the method may further comprise determining an azimuth codebook based on the received number of azimuth antenna elements, and determining an elevation codebook based on the received number of elevation antenna elements. The azimuth precoder-matrix-indicator may be based on the azimuth codebook, and the elevation precoder-matrix-indicator may be based on the elevation codebook.

In the method of the fourth embodiment, the method may further comprise determining an azimuth codebook based on the received number of azimuth antenna elements and a first step size, and determining an elevation codebook based on the received number of elevation antenna elements and a second step size. The azimuth precoder-matrix-indicator may be based on the azimuth codebook, and the elevation precoder-matrix-indicator is based on the elevation codebook.

In the method of the fourth embodiment, the method may further comprise receiving an array type. The azimuth codebook and the elevation codebook may be based on the array type.

In the method of the fourth embodiment, the azimuth codebook may be based on discrete-fourier-transform vectors of a dimension specified by the received number of azimuth antenna elements and based on the first step size.

In the method of the fourth embodiment, the method may further comprise receiving a cross-polarization type.

In the method of the fourth embodiment, the azimuth codebook may be based on a combination of a two-element codebook and discrete-fourier-transform vectors having a dimension based on the received number of azimuth antenna elements.

In the method of the fourth embodiment, the elevation codebook may be based on discrete-fourier transform vectors having a dimension based on a number of elevation antenna elements and based on the second step size.

In the method of the fourth embodiment, the elevation codebook may be based on a combination of a two-element codebook and discrete-fourier-transform vectors having a dimension based on the received number of elevation antenna elements.

According to a fifth embodiment, an apparatus comprises at least one processor. The apparatus also comprises at least one memory comprising computer program code. The at least one memory and the computer program code can be configured, with the at least one processor, to cause the apparatus at least to receive a number of azimuth antenna elements. The apparatus can also be caused to receive a number of elevation antenna elements. The apparatus can also be caused to transmit an azimuth precoder-matrix-indicator. The apparatus can also be caused to transmit an elevation precoder-matrix-indicator. The apparatus can also be caused to receive transmissions based on the transmitted azimuth precoder-matrix-indicator and the transmitted elevation precoder-matrix-indicator.

In the apparatus of the fifth embodiment, the apparatus can comprise one of a user equipment and a relay.

In the apparatus of the fifth embodiment, the apparatus may be further caused to determine an azimuth codebook based on the received number of azimuth antenna elements, and the apparatus may be further caused to determine an elevation codebook based on the received number of elevation antenna elements. The azimuth precoder-matrix-indicator may be based on the azimuth codebook, and the elevation precoder-matrix-indicator may be based on the elevation codebook.

In the apparatus of the fifth embodiment, the apparatus may be further caused to determine an azimuth codebook based on the received number of azimuth antenna elements and a first step size. The apparatus may be further caused to determine an elevation codebook based on the received number of elevation antenna elements and a second step size. The azimuth precoder-matrix-indicator may be based on the azimuth codebook, and the elevation precoder-matrix-indicator may be based on the elevation codebook.

In the apparatus of the fifth embodiment, the apparatus may be further caused to receive an array type, and the azimuth codebook and the elevation codebook may be based on the array type.

In the apparatus of the fifth embodiment, the azimuth codebook may be based on discrete-fourier-transform vectors of a dimension specified by the received number of azimuth antenna elements and based on the first step size.

In the apparatus of the fifth embodiment, the apparatus may be further caused to receive a cross-polarization type.

In the apparatus of the fifth embodiment, the azimuth codebook may be based on a combination of a two-element codebook and discrete-fourier-transform vectors having a dimension based on the received number of azimuth antenna elements.

In the apparatus of the fifth embodiment, the elevation codebook may be based on discrete-fourier transform vectors having a dimension based on a number of elevation antenna elements and based on the second step size.

In the apparatus of the fifth embodiment, the elevation codebook may be based on a combination of a two-element codebook and discrete-fourier-transform vectors having a dimension based on the received number of elevation antenna elements.

According to a sixth embodiment, a computer program product can be embodied on a non-transitory computer readable medium. The computer program product can be configured to control a processor to perform a process comprising receiving a number of azimuth antenna elements. The process can also comprise receiving a number of elevation antenna elements. The process can also comprise transmitting an azimuth precoder-matrix-indicator. The process can also comprise transmitting an elevation precoder-matrix-indicator. The process can also comprise receiving transmissions based on the transmitted azimuth precoder-matrix-indicator and the transmitted elevation precoder-matrix-indicator.

According to a seventh embodiment, a system can comprise a first apparatus. The first apparatus can comprise at least one first processor. The first apparatus can comprise at least one first memory comprising first computer program code. The at least one first memory and the first computer program code can be configured, with the at least one first processor, to cause the first apparatus at least to transmit a number of azimuth antenna elements. The first apparatus can also be caused to transmit a number of elevation antenna elements. The first apparatus can also be caused to receive an azimuth precoder-matrix-indicator. The first apparatus can also be caused to receive an elevation precoder-matrix-indicator. The first apparatus can also be caused to transmit based on the received azimuth precoder-matrix-indicator and the received elevation precoder-matrix-indicator. The system can also comprise a second apparatus. The second apparatus can also comprise at least one second processor. The second apparatus can also comprise at least one second memory comprising second computer program code. The at least one second memory and the second computer program code can be configured, with the at least one second processor, to cause the second apparatus at least to receive the number of azimuth antenna elements. The second apparatus can also be caused to receive the number of elevation antenna elements. The second apparatus can also be caused to transmit the azimuth precoder-matrix-indicator. The second apparatus can also be caused to transmit the elevation precoder-matrix-indicator. The second apparatus can also be caused to receive transmissions based on the transmitted azimuth precoder-matrix-indicator and the transmitted elevation precoder-matrix-indicator.

According to an eighth embodiment, an apparatus can comprise a first transmitting means for transmitting a number of azimuth antenna elements. The apparatus can also comprise a second transmitting means for transmitting a number of elevation antenna elements. The apparatus can also comprise a first receiving means for receiving an azimuth precoder-matrix-indicator. The apparatus can also comprise a second receiving means for receiving an elevation precoder-matrix-indicator. The apparatus can also comprise a third transmitting means for transmitting based on the received azimuth precoder-matrix-indicator and the received elevation precoder-matrix-indicator.

According to a ninth embodiment, an apparatus can comprise a first receiving means for receiving a number of azimuth antenna elements. The apparatus can also comprise a second receiving means for receiving a number of elevation antenna elements. The apparatus can also comprise a first transmitting means for transmitting an azimuth precoder-matrix-indicator. The apparatus can also comprise a second transmitting means for transmitting an elevation precoder-matrix-indicator. The apparatus can also comprise a third receiving means for receiving transmissions based on the transmitted azimuth precoder-matrix-indicator and the transmitted elevation precoder-matrix-indicator.

BRIEF DESCRIPTION OF THE DRAWINGS

For proper understanding of the invention, reference should be made to the accompanying drawings, wherein.

DETAILED DESCRIPTION

Figure 1:
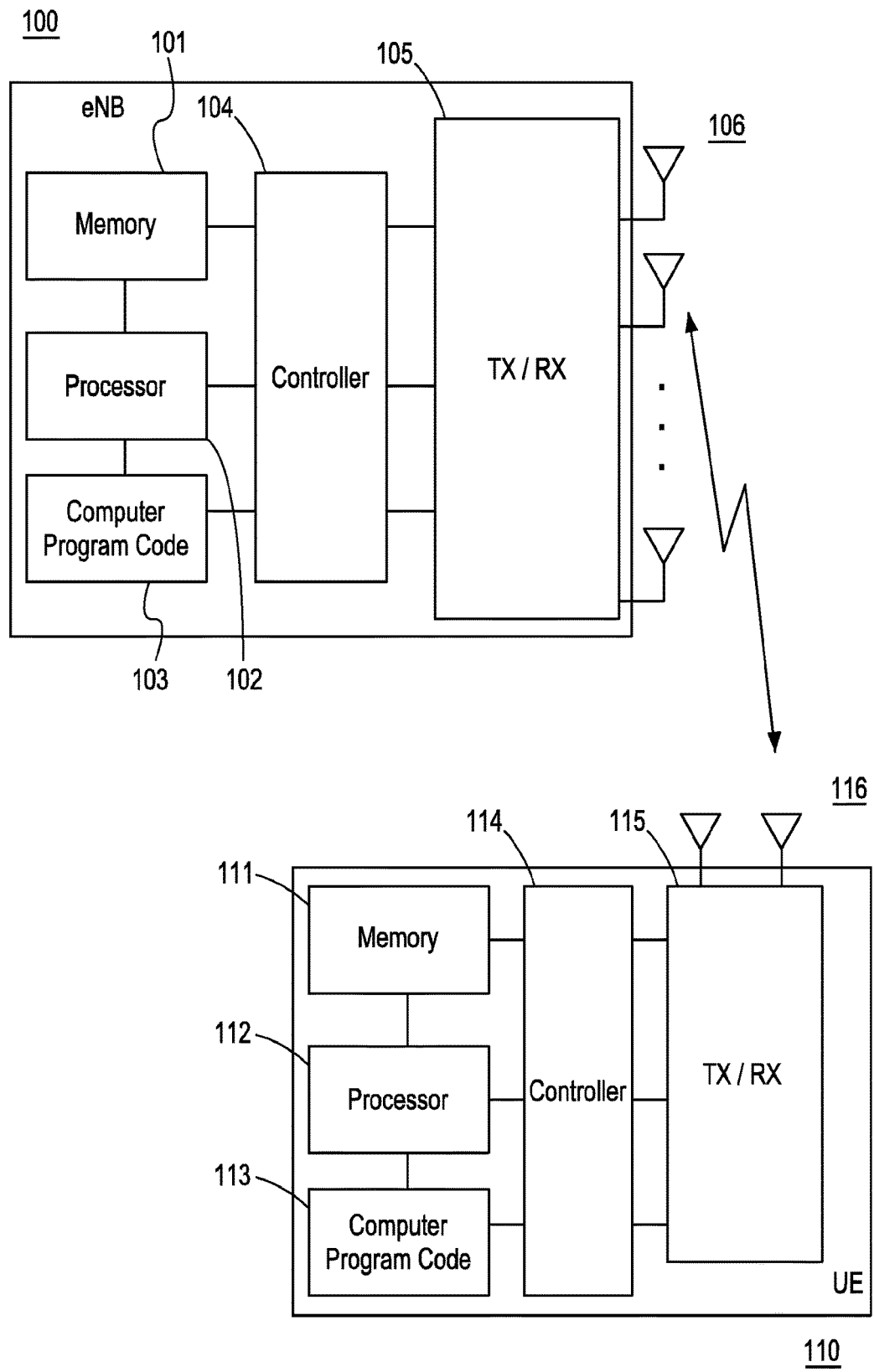
FIG. 1 illustrates a communication system comprising a evolved Node B (eNB) communicating with a user equipment (UE).

Embodiments of the present invention are directed at providing a low-overhead, flexible feedback framework for supporting a product codebook for Frequency-Division-Duplexing (FDD) Massive MIMO/high order Multi-User MIMO (MU-MIMO). Embodiments of the present invention provide a method for defining, in real time, Rank-1 codebooks to be used for a product codebook methodology for arbitrary array sizes. The Rank-1 codebooks can also be used for both two-dimensional (2D) cross-polarization (cross-pol) arrays and 2D linear vertical arrays. Embodiments of the present invention can be based on the use of Discrete-Fourier-Transform (DFT) vectors. Embodiments of the present invention provide a flexible signaling framework and a flexible codebook construction framework that provides a method for informing a newly-registered user equipment (UE) about a product codebook that is in use by a base station. Embodiments of the present invention can handle both 2D linear, vertically polarized arrays and 2D cross-pol arrays, where, in both cases, there can be an arbitrary number of elements in terms of azimuth and elevation. The codebooks can be specified by a small parameter set, which can be signaled to the UE upon registration with the eNB. Embodiments of the present invention can specify and/or can signal to the UE a cross-pol type parameter that resolves the ambiguity that results when deciding how to form the azimuth Channel-State-Information-Reference-Signal (CSI-RS) ports and the elevation CSI-RS ports when a 2D cross-pol array is used at the evolved Node B (eNB). Signaling these parameters enable the UE to directly determine the dimensions of the azimuth/elevation CSI-RS and the dimensions of the azimuth/elevation codebooks. Embodiments of the present invention can cover both the event where the codebooks are calculated ahead of time and the event where the codebooks are calculated on the fly.

In the event that the codebooks are specified ahead of time, the possible set of 1D codebooks can be used on either elevation or azimuth dimensions, and the specific codebook to be chosen can depend on a number of antennas in both dimensions and can depend on the cross-pol type. The UE is then signaled the number of antennas in both dimensions, and the cross-pol type, so that the appropriate pre-computed codebooks can be used for elevation and azimuth.

Embodiments of the present invention can relate to massive Multiple-In-Multiple-Out (MIMO) communication, and especially to the acquisition of channel-state information (for example, codebook feedback) for a large number of antennas. A two-dimensional antenna array that is used for Massive MIMO may potentially have a large number of antenna elements in both the horizontal and the vertical dimensions. With a product codebook strategy, a separate codebook may be defined for the azimuth and elevation dimensions. A general problem with codebook design is that the codebook may need to be defined for a specific number of antennas in the antenna array, and the codebook design may need to account for the array geometry of the array (for example, whether the array is a uniform linear array (ULA) of vertical elements or whether the array is a uniform linear array of cross pol (XP) elements). With Massive MIMO systems, there are a wide variety of possibilities for array geometry, and providing standardization support for each possible configuration can be unwieldy and burdensome. Furthermore, if one cell site has one antenna array configuration and another cell site has a different antenna array configuration, then managing a joint-transmission strategy can be difficult because the user equipment (UE) would generally have to know which codebook is being used by both sites.

In view of the above, a method may be needed to provide efficient signaling and support for arbitrary array configurations in massive MIMO systems, using the product-codebook methodology.

One component of Massive MIMO is to enable high-order multi-user MIMO for high user-density deployments. The use of two-dimensional arrays enables the simultaneous exploitation of both an azimuth and an elevation dimension of the channel. Using two-dimensional arrays has been shown to provide significant gains in macro-cell deployments, both in 3GPP simulation methodology cases as well as in realistic deployments.

An important determination to make when implementing a Massive MIMO approach is determining how to acquire channel state information at the transmit array for the large number of antennas so that transmitted beamforming vectors can be computed to perform Multi-User MIMO (MU-MIMO) transmission. In MU-MIMO transmission, some number of UEs within the same cell are transmitted to on the same time-frequency resources on the same array, and the precoding/beamforming vectors are designed in such a way as to create multiple parallel spatial channels having minimal cross-talk. In MU-MIMO transmission, minimal cross-talk can be achieved by designing the beam weights for one UE to have a maximal response towards that intended UE, while having minimal response (or nulls) towards the other paired UEs. Minimizing the cross talk often requires precise knowledge of the downlink channel. For Time-Division-Duplexing (TDD) systems, this precise knowledge can be obtained by leveraging uplink/downlink (UL/DL) reciprocity and antenna array calibration, and, hence, the Channel-State-Information (CSI) acquisition problem for TDD is considered to be relatively straight forward. For Frequency-Division-Duplexing (FDD) systems, there is generally no UL/DL reciprocity in the short-term channel state. As such, some form of UE feedback is generally used to provide the evolved Node B (eNB) with channel state information (CSI) (for example, codebook feedback, covariance feedback, eigenvector feedback (quantized or unquantized), etc.). However, the standard codebook feedback approach generally involves establishing a codebook of precoding vectors (rank 1) and matrices (for ranks>1), where the codebook is designed for the specific size (and preferably also the geometry) of the antenna array being used by the eNB. With the standard codebook approach, as the number of antennas M increases, the size of the codebook generally must also increase to adequately span the M-dimensional space in order to enable the tracking of the downlink (DL) channel to the precision required by the MU-MIMO transmission scheme. The result is that the typical FDD codebook approach for Massive MIMO requires a prohibitive level of UE feedback and UE computational complexity to support MU-MIMO operation.

The idea behind a product codebook is to break up the codebook feedback process into two separate parts: one part for the azimuth dimension and one part for the elevation dimension. In a codebook methodology, antenna aggregation (or antenna virtualization) is generally used to separate one dimension of the channel (e.g., azimuth) from the other dimension (e.g., elevation) of the channel. Antenna aggregation generally refers to the strategy by which multiple antenna ports are combined in some way to form a single virtual antenna port. Examples of antenna aggregation (or antenna virtualization) can comprise random precoding, cyclic shift diversity, cyclic-delay diversity, etc. In the product codebook methodology, the eNB can first perform antenna aggregation across the azimuth dimension of an array to collapse the 2D array into elevation-oriented ports over which elevation-oriented CSI-RS is transmitted (for example, each row of the array is aggregated into a single vertical virtual antenna port during the transmission of the elevation-oriented CSI-RS). The UE then receives the elevation-oriented CSI-RS and computes and feeds back an elevation-oriented Precoder-Matrix-Indicator (PMI). Next, the eNB performs antenna aggregation across the elevation dimension of the array to collapse the 2D array into azimuth-oriented ports over which azimuth-oriented CSI-RS is transmitted (for example, each column of the array is aggregated into a single azimuth virtual antenna port during the transmission of the azimuth-oriented CSI-RS). The UE receives the azimuth-oriented CSI-RS and computes and feeds back an azimuth-oriented PMI. The eNB then takes the azimuth-oriented and elevation-oriented PMIs and computes the final full dimension precoder to be a kronecker product of those two PMIs (where "full-dimension" generally refers to the fact that the dimension of the final precoder is the same as the total number of ports in the 2D array, which is the number of azimuth ports×number of elevation ports, where for calculating the total number of ports the polarization dimension is considered to belong to either the azimuth or the elevation dimension, but not to both). The benefit of the product codebook methodology is that the UE performs two smaller PMI feedback processes (one process for azimuth, another process for elevation) rather than one very large PMI feedback process (one for all the ports of the array).

As described above, a method may be needed to provide efficient signaling and to support arbitrary array configurations in massive MIMO systems using the product codebook methodology. Methods for efficiently specifying and communicating, to the UE, the codebooks being used in the product codebook methodology may also be needed.

Embodiments of the present invention are directed at providing a low-overhead flexible feedback framework for supporting the product codebook for FDD Massive MIMO/high order MU-MIMO. The embodiments are described in greater detail below.

Embodiments of the present invention can assume the use of a large scale 2D antenna array (M elements in azimuth by N elements in elevation, for example, M=16, N=10). Embodiments of the present invention define, in real time, the Rank-1 codebooks to be used for the product codebook methodology for arbitrary array sizes, and for both 2D cross-pol arrays and 2D linear vertical arrays. The methodology of embodiments of the present invention can be based on the idea of using Discrete-Fourier-Transform (DFT) vectors. Embodiments of the present invention are directed to a flexible signaling framework and a flexible codebook construction framework that provide a method for informing a UE (for example, a newly-registered UE) about the product codebook that is in use by the base station. Embodiments of the present invention have the ability to handle both 2D linear vertically polarized arrays and 2D cross-pol arrays, where, in both cases, there can be an arbitrary number of elements in azimuth and elevation. The codebooks are specified by a small parameter set, which can be signaled to the UE upon, for example, registration at the eNB. The strategy of embodiments of the present invention can specify and/or signal to the UE a cross-pol type parameter that resolves the ambiguity that results when deciding how to form the azimuth CSI-RS ports and the elevation CSI-RS ports when a 2D cross-pol array is used at the eNB. For 2D cross-pol arrays, signaling the number of antennas in elevation and azimuth may not be sufficient for determining the parameters of the azimuth/elevation CSI-RS and the dimensions of the azimuth/elevation codebooks due to the multiple ways that polarization can be handled when the eNB transmits the azimuth-oriented and elevation-oriented CSI-RS. Signaling these parameters enables the UE to directly determine the dimensions of the azimuth/elevation CSI-RS and the dimensions of the azimuth/elevation codebooks. Embodiments of the present invention are directed to both the case where the codebooks are calculated ahead of time and stored at the UE and eNB, and also the case where the codebooks are calculated on the fly. In the event that the codebooks are specified ahead of time, there may be a specification of the possible set of 1D codebooks that could be used on either elevation or azimuth dimensions, and the specific codebook to be chosen may depend on the number of antennas in both dimensions and the cross-pol type. The UE can then receive a signaling that indicates the number of antennas in both dimensions and the cross-pol type so that the right pre-computed codebooks can be used for elevation and azimuth.

The details and various options associated with embodiments of the present invention are now described, where the discussion is organized as follows. First, the two array configurations that are being considered are described. The two array configurations are the 2D uniform linear array of vertically polarized elements (2D-ULA) and the 2D uniform cross-pol array (2D-XP). Next, the basic codebook construction methodology is described. First, 1D arrays are described to show the basic concept of leveraging DFT matrices for both 1D-ULA and 1D-XP arrays. Next, the 1D construction concepts are extended to handle both the 2D-ULA and the 2D-XP array types. The 2D-ULA case is relatively straightforward, but the 2D-XP case may be more complicated given that there are four ways to handle the aggregation of both the elevation and azimuth dimensions during the transmission of the azimuth-oriented and the elevation-oriented CSI-RSs. These four ways of antenna aggregation result from the four ways in which the polarization dimension can be handled during the aggregation. To fully cover the 2D-XP case, the four ways to handle the antenna aggregation are described, and the following description shows how the azimuth and elevation codebooks would be constructed in all four cases. The following description also describes how the final precoder vectors are formed in all four cases. The following description then describes the signaling methodology to support the product codebook strategies being described.

With regard to antenna-array configurations, two array configurations are described. The 2D uniform linear array (ULA) of vertically polarized elements and the 2D uniform cross-pol array (the 2D-XP array).

FIG. 1 illustrates an example of a communication system comprising an eNB 100 communicating with a UE 110. The eNB 100 comprises a memory 101, a processor 102, and computer program code 103, all controlled by controller 104 to transmit and receive signals to and from the UE 110 via the one or more transceivers 105 coupled to the one or more antennas 106. The UE 110 comprises a memory 111, a processor 112, and computer program code 113, all controlled by controller 114 to transmit and receive signals to and from the eNB 100 via the one or more transceivers 105 coupled to the one or more antennas 116.

Figure 2:
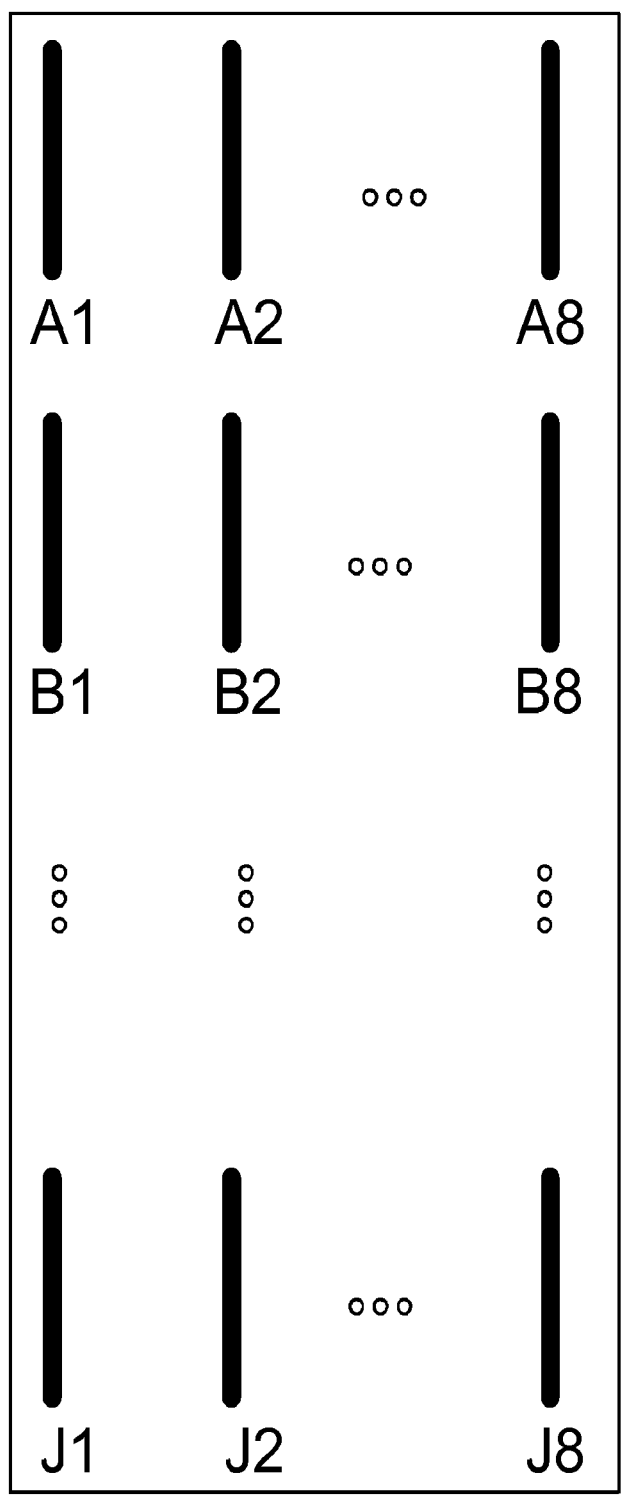
FIG. 2 illustrates an example of a two-dimensional uniform-linear array (2-D ULA) of vertically-polarized elements in accordance with embodiments of the invention.

FIG. 2 illustrates an example of a 2D ULA of vertically polarized elements where there are 8 elements in azimuth and 10 elements in elevation for a total of 80 elements. This array can be deployed in a form factor comparable to the 8 antenna ULAs employed for LTE-Release-10.

Figure 3:
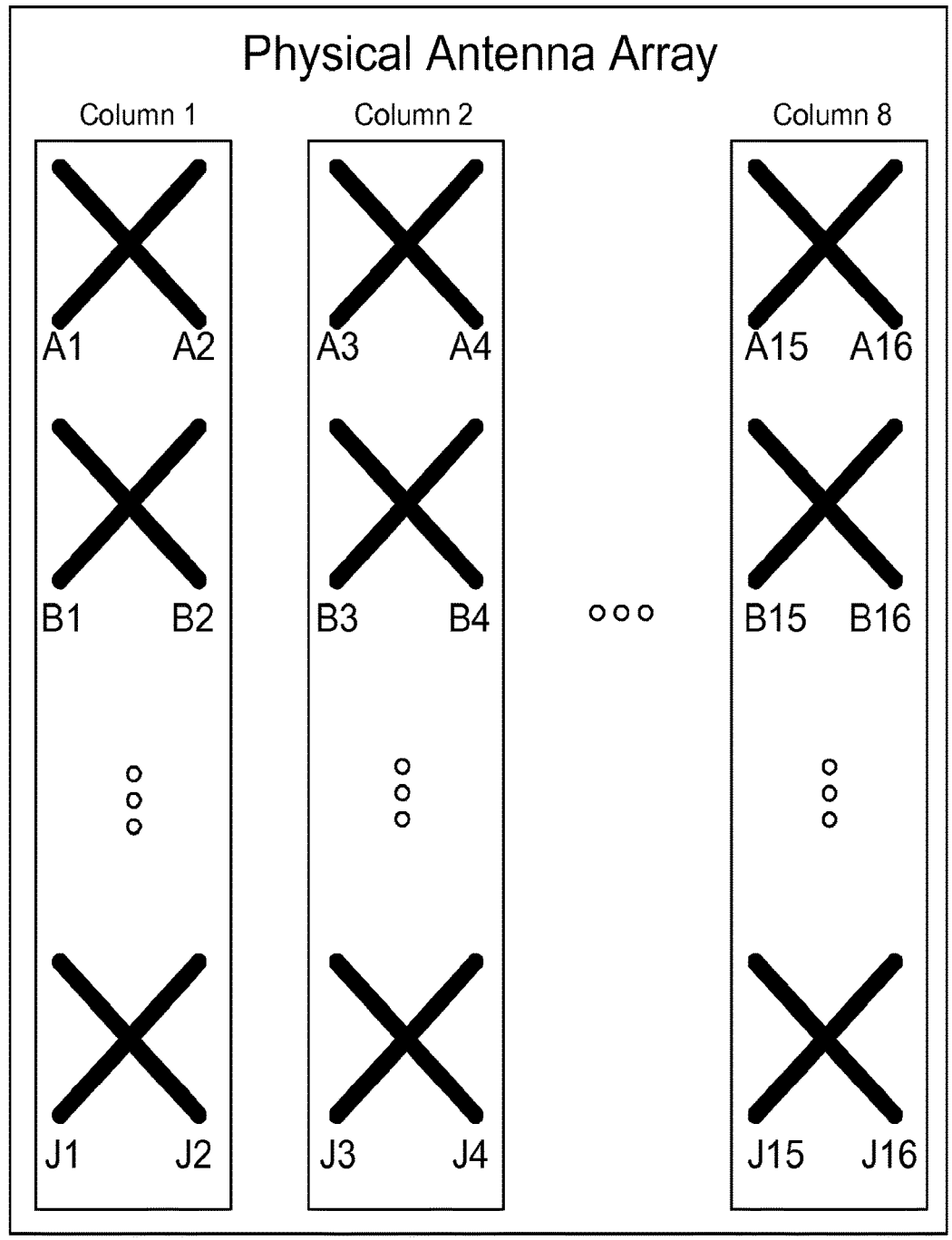
FIG. 3 illustrates an example of a 2D array of cross-polarized elements in accordance with embodiments of the invention.
Figure 4A:
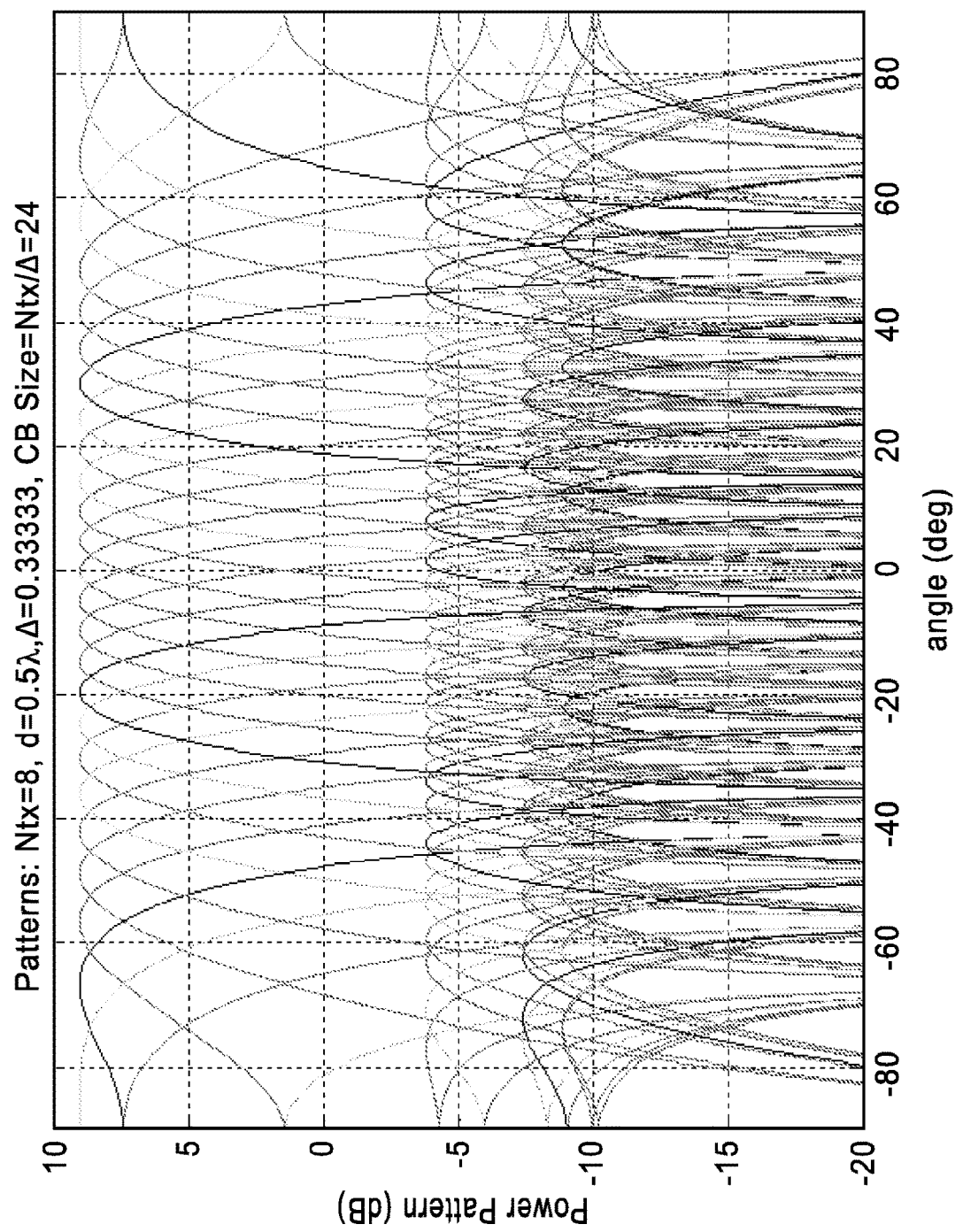
FIGS. 4(a)-4(d) plot the patterns of the columns of F(N,Δ) for an N=8 ULA for different values of a step size Δ.
Figure 4B:
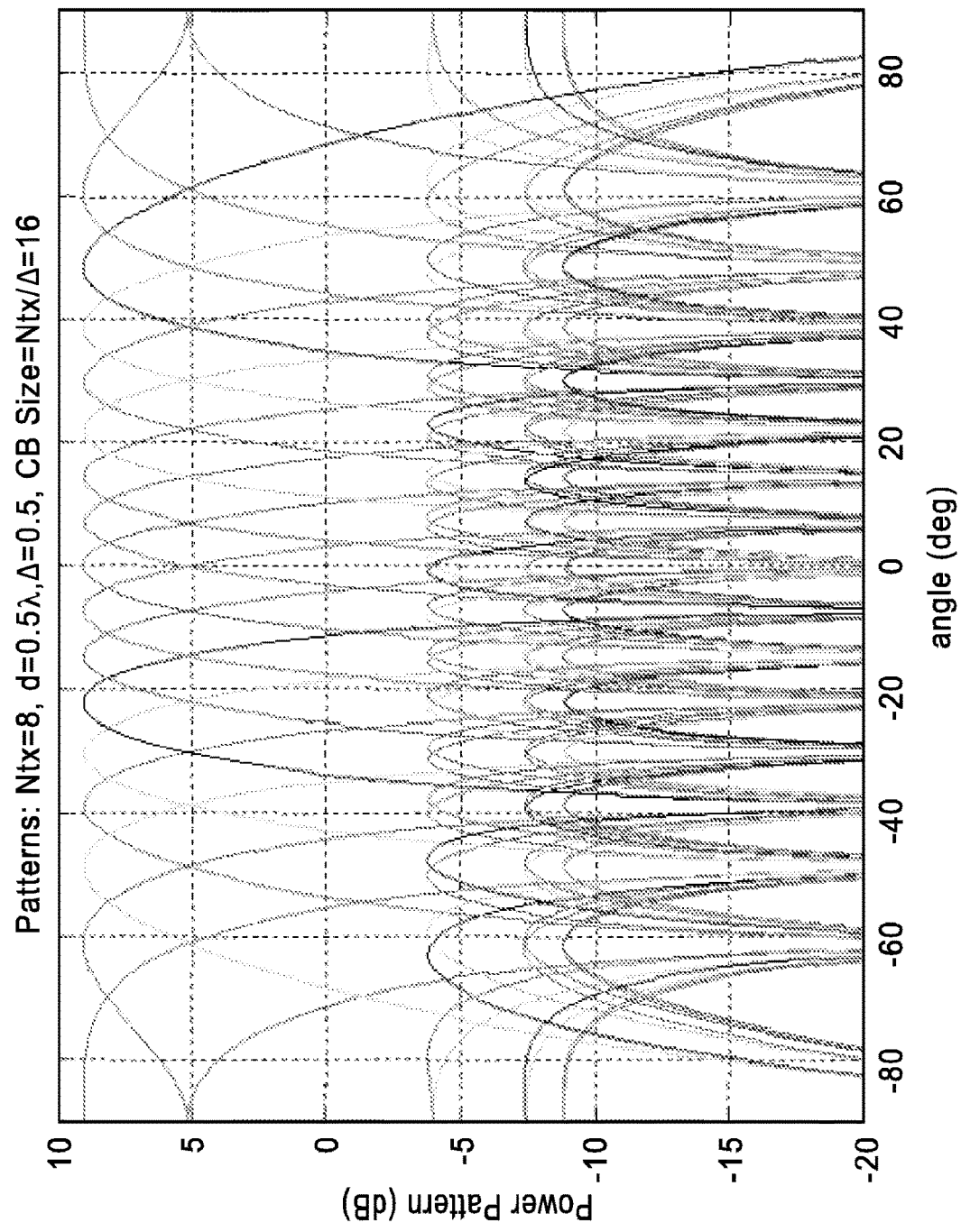
Figure 4C:
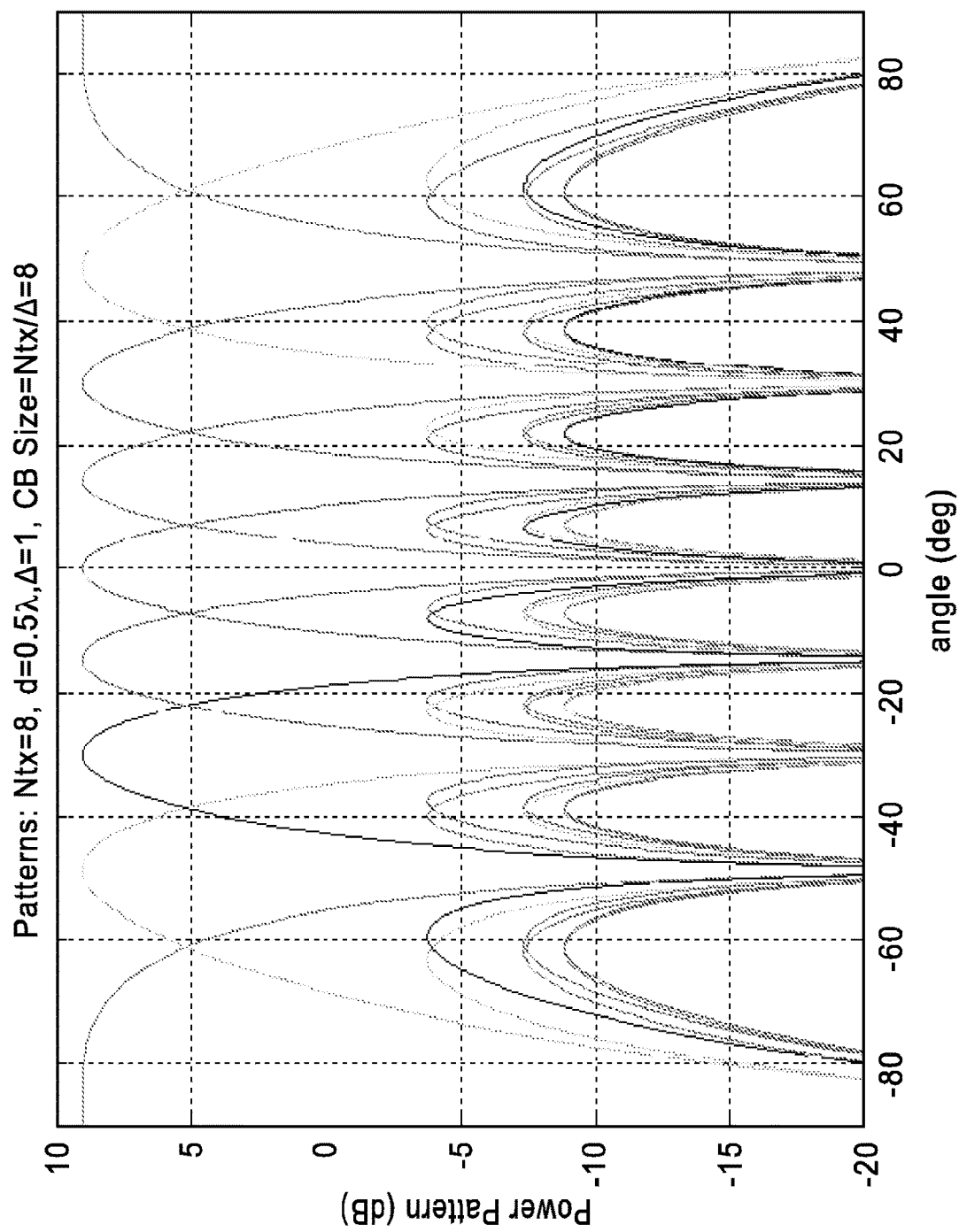
Figure 4D:
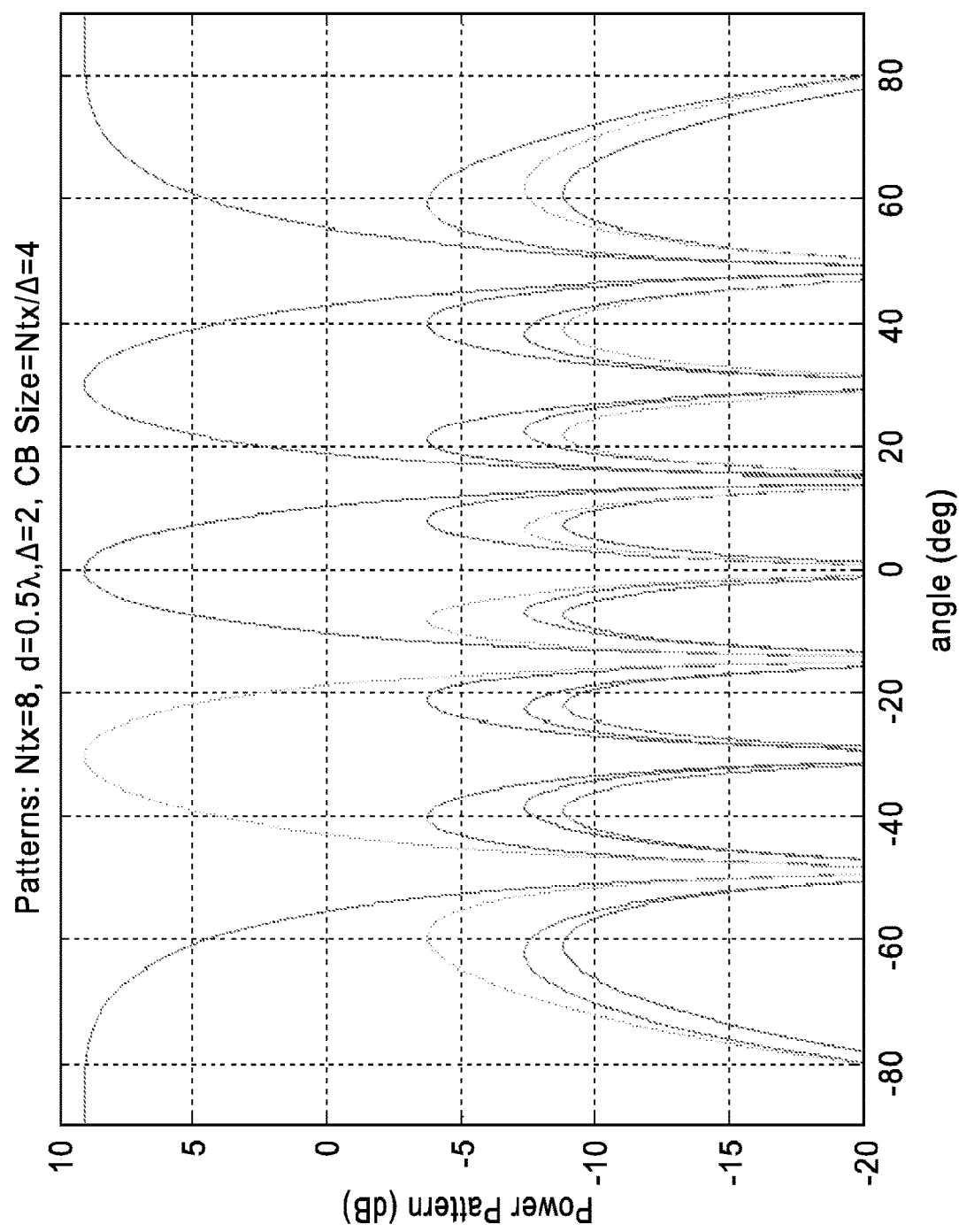

FIG. 3 illustrates an example of a 2D array of cross-polarized elements, where there are 8 columns and 10 rows of cross-pol elements for a total of 160 antenna elements. This array can be deployed in a form factor that is roughly twice the form factor of the 8 antenna cross-pol arrays used for LTE-Release-10. Each antenna shown in the diagrams is intended to represent a single antenna port, which, in general, can be implemented as a physical antenna connected to a transceiver. As a result, the 2D-ULA in FIG. 2 has 80 antenna ports, each with a transceiver, and the 2D-XP array in FIG. 3 has 160 antenna ports, each with a transceiver.

FIG. 2 illustrates example antenna arrays for massive MIMO, a Uniform Linear Vertically-Polarized Array with M=8 antennas in azimuth, M=8 columns of antenna elements, and with each column containing N=10 vertically polarized elements (N=10 rows) for a total of 80 total physical antenna elements.

FIG. 3 illustrates example antenna arrays for Massive MIMO, Cross-Pol Antenna Array with M=16 antennas in azimuth, M/2=8 columns of cross pols antennas, and with each column containing N=10 cross pol pairs (N=10 rows) for a total of 160 total physical antenna elements.

With regard to Rank 1 Codebook Construction for 1D Arrays: before considering 2D arrays that use the product codebook methodology, the following description first describes a simple codebook construction methodology for 1D arrays, where 1D uniform linear vertically-polarized arrays (1D-ULA) are first considered. The following description then describes the modifications needed to support 1D uniform cross-pol arrays (1D-XP). Later, this 1D codebook construction methodology is extended to 2D arrays that employ the product codebook methodology. The Rank 1 case is described in greater detail below.

For a 1D ULA, rank 1 codebooks are constructed based on DFT vectors as follows. Consider the matrix F having dimension N by N/Δ, where the (n,m)$^{th}$ element of F is given by:

$$F_{n,m}(N, \Delta) = e^{-j\frac{2\pi}{N}nm\Delta}$$
$$n = 0, 1, \ldots N-1, m = 0, 1, \ldots (N/\Delta) - 1$$

where n=0 . . . N−1 and m=0 . . . N/Δ−1, and Δ is a step size. The full matrix F is given by:

$$F(N, \Delta) = \begin{bmatrix} 1 & 1 & 1 & \ldots & 1 \\ 1 & e^{-j\frac{2\pi}{N}(\Delta)} & e^{-j\frac{2\pi}{N}(2)\Delta} & \ldots & e^{-j\frac{2\pi}{N}(\frac{N}{\Delta}-1)\Delta} \\ 1 & e^{-j\frac{2\pi}{N}2(\Delta)} & e^{-j\frac{2\pi}{N}2(2)\Delta} & \ldots & e^{-j\frac{2\pi}{N}2(\frac{N}{\Delta}-1)\Delta} \\ \vdots & \vdots & \vdots & \vdots & \vdots \\ 1 & e^{-j\frac{2\pi}{N}(N-1)(\Delta)} & e^{-j\frac{2\pi}{N}(N-1)(2)\Delta} & \ldots & e^{-j\frac{2\pi}{N}(N-1)(\frac{N}{\Delta}-1)\Delta} \end{bmatrix}$$

The columns of the matrix F(N, Δ) can be used as a Rank-1 codebook for an azimuth-only (1D) Uniform-Linear-Array (ULA) having N antennas.

Figure 5A:
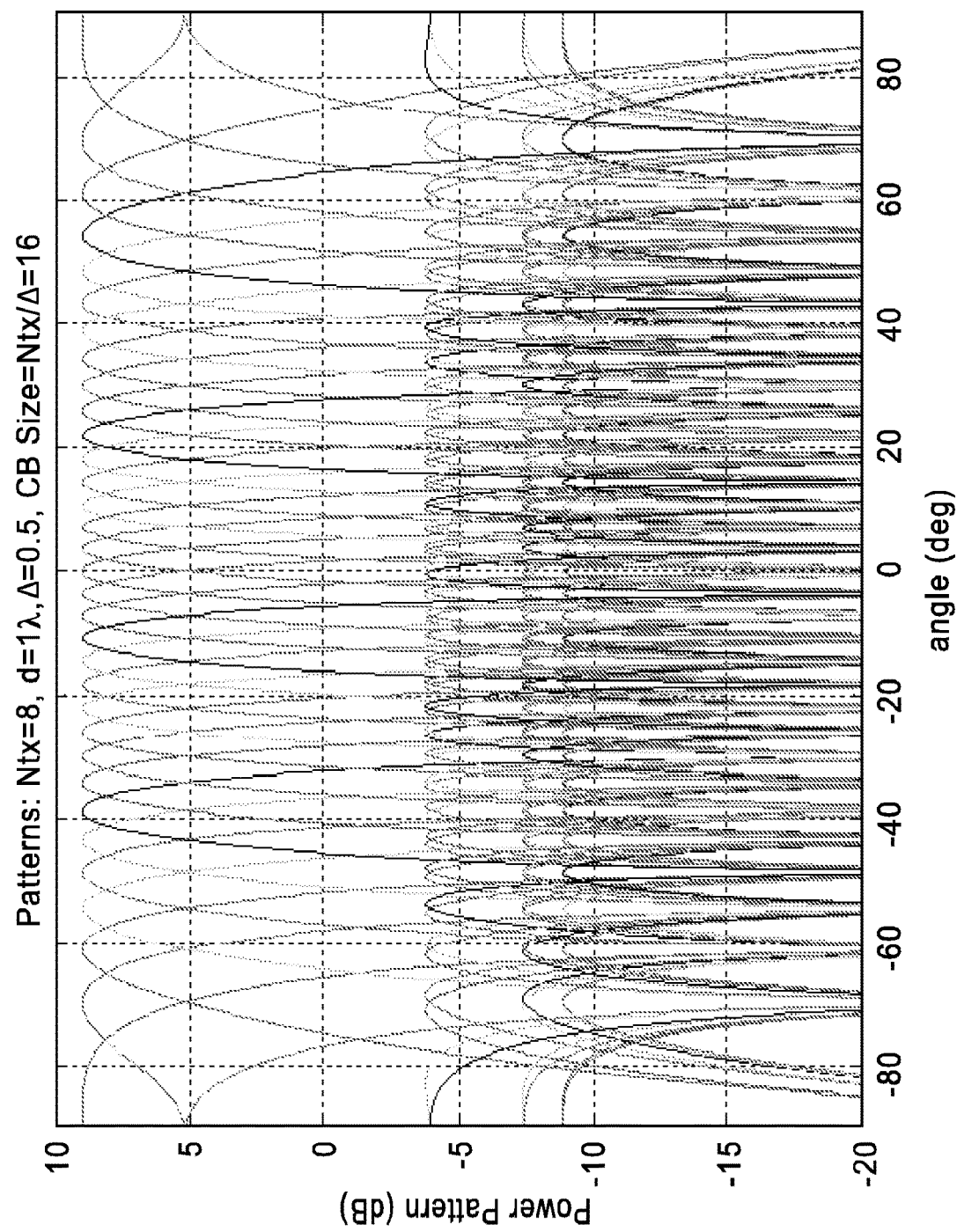
FIGS. 5(a)-5(b) illustrate patterns of the columns of F(N,Δ) for an N=8 ULA for a step size Δ=0.5.
Figure 5B:
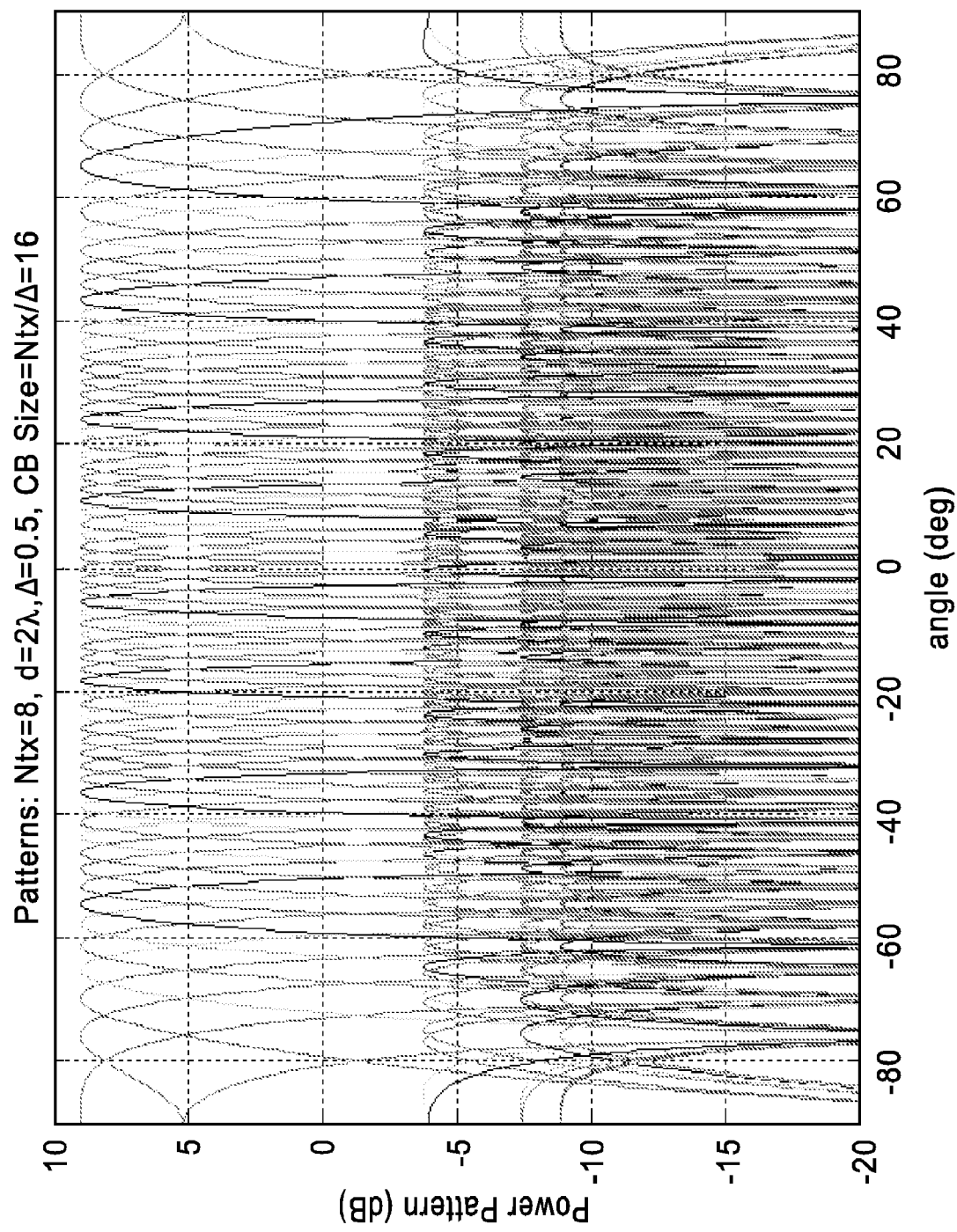

FIGS. 4(a)-4(d) plot the patterns of the columns of F(N, Δ) for an N=8 ULA for different values of a step size Δ. As is clear from FIGS. 4(a)-4(d), there is a tradeoff between a codebook size and the resolution at which the visible space is covered. The codebook size can be the number of columns in F(N, Δ)) and is given by N/Δ. Increasing the step size Δ will lower the codebook size, but at the cost of a more sparse covering of the visible angular space. The patterns may be affected when the inter-element spacing in the ULA is increased beyond a half wavelength (which is the maximum spacing for a ULA for there to be no spatial aliasing within the visible angular region). FIGS. 5(a)-5(b) illustrate patterns of the columns of F(N, Δ) for an N=8 ULA with one-wavelength spacing and two-wavelength spacing for a step size Δ=0.5. As shown in FIGS. 5(a)-5(b), as the spacing is increased to 1 wavelength and 2 wavelengths, the beam weight vectors have multiple peaks within the −90 . . . +90 visible region (rather than the single peak seen with half-wavelength spacing) which is the result of spatial aliasing. This phenomenon may be a fundamental constraint for ULAs, but the angular region may still being covered sufficiently by the 16-element codebook, although spatial aliasing may have to be tolerated. The rank 1 codebook for 1D ULAs is then given by:

$$C_{ula} = F(N, \Delta)$$

When using an arbitrarily-sized 1D-ULA and using codebook vectors specified by the matrix F(N, Δ), it is clear that the entire codebook can be completely specified with two parameters: N and Δ. Note that because of the behavior shown in FIG. 4 and FIG. 5, the spacing between the antenna elements does not need to be specified in order to construct the codebook. Therefore, to handle arbitrarily sized ULAs, the UE can simply be told the value of N and Δ, and the UE may automatically know the codebook being used by the eNB. The value of Δ may be specified in advance for all possible codebooks that the UE would use.

For a 1D XP array, the DFT codebook idea can be used in a manner similar to how the 8 antenna codebook is defined in LTE Release-10. If a 1D cross pol array having N pairs of cross-pol elements (2N total antenna elements) is used, then the DFT vectors are chosen from the matrix F(N, Δ) matrix as is done for the N-element ULA. Embodiments of the present invention can then Kronecker them together with all possible entries of the LTE Release-8 2 antenna codebook to form the overall codebook. (In other embodiments, other 2-antenna codebooks could be used instead of the LTE Release-8 2-antenna codebook.) Mathematically, the overall codebook for the 1D XP array can be formed as follows. First, the 2-antenna codebook matrix G can be formed as follows:

$$G = \begin{bmatrix} 1 & 1 & 1 & 1 \\ 1 & -1 & j & -j \end{bmatrix}$$

Then, the codebook for the 1-D XP array with 2N antennas (N pairs of cross pol elements) is given by:

$$C_{xp} = kron(G, F(N, \Delta))$$

Embodiments of the present invention can use the same numbering convention for the antennas as in the LTE Release-10 specification (for example, antennas 1 through N/2 are co-polarized with one polarization and antennas N/2 through N are co-polarized with the other polarization).

With regard to rank 1 Codebook Construction for 2D Arrays using the Product Codebook Methodology: for two-dimensional arrays using the product codebook methodology, embodiments of the present invention specify two codebooks: an azimuth codebook for use in the azimuth dimension and an elevation codebook for use in the elevation dimension. Embodiments of the present invention use the design methodology involving the DFT matrices previously described for specifying the codebooks to be used on each dimension (azimuth/elevation) of the 2D array.

However, before considering the details of the azimuth/elevation codebook designs, embodiments of the present invention first consider the CSI-RS processes that support the product codebook methodology. Note that, in conjunction with the specification of the azimuth and elevation codebooks, the eNB may also transmit azimuth-oriented CSI-RS and elevation-oriented CSI-RS that both match the respective dimensions of the azimuth and elevation codebooks. For the azimuth PMI selection process, the eNB transmits azimuth-oriented CSI-RS out of virtual antenna ports formed by aggregating across the elevation dimension (for example, each column is aggregated to form a single azimuth CSI-RS port). For the elevation PMI selection process, the eNB transmits elevation-oriented CSI-RS out of virtual antenna ports formed by aggregating across the azimuth dimension (for example, each row is aggregated to form a single elevation CSI-RS port). Embodiments of the present invention design an azimuth-oriented codebook that corresponds to the aggregation process used when transmitting the azimuth CSI-RS. Embodiments of the present invention also similarly design an elevation-oriented codebook that corresponds to the aggregation process used when transmitting the elevation CSI-RS. The overall design for the CSI-RS and corresponding codebook for both elevation and azimuth is fairly straightforward for 2D-ULAs but becomes more complicated for 2D-XP arrays due to the multiple ways of handling the polarization dimension in the aggregation process for CSI-RS transmission.

Also, before considering the azimuth and elevation codebook designs, it is helpful to recall that the product codebook methodology involves the feedback of two PMIs from the UE. The UE receives the elevation CSI-RS and selects the best elevation codebook vector from the elevation codebook. The UE feeds back a corresponding elevation PMI. Next, the UE receives the azimuth CSI-RS and selects the best azimuth codebook vector from the azimuth codebook. The UE feeds back a corresponding azimuth PMI. The final codebook vector used by the eNB during the DL transmission can then be computed from the Kronecker product of the azimuth codebook vector indicated by the fed-back azimuth PMI with the elevation codebook vector indicated by the fed-back elevation PMI.

In view of the above, embodiments of the present invention consider the design of the constituent codebooks for the product codebook methodology for both 2D-ULAs and 2D-XP arrays.

For 2D ULAs, the construction for both the azimuth and elevation codebooks is relatively simple. Embodiments of the present invention use the methodology described earlier for 1D arrays and pick N and Δ to specify the codebook for the azimuth dimension:

$$C_{2D\_ula\_az}=F(N_{az},\Delta_{az})$$

where $N_{az}$ is the number of antenna elements in the azimuth dimension (number of columns) and $\Delta_{az}$ is the step size for the DFT matrix forming the azimuth codebook. Embodiments of the present invention then pick N and Δ to specify the codebook for the elevation dimension:

$$C_{2D\_ula\_el}=F(N_{el},\Delta_{el})$$

where $N_{el}$ is the number of antenna elements in the elevation dimension (number of rows) and $\Delta_{el}$ is the step size for the DFT matrix forming the azimuth codebook.

When the UE selects the $i^{th}$ azimuth codebook vector $V_{azi}$ and the $j^{th}$ elevation code vector $V_{elj}$, the final precoding vector is computed to be $V_{ij}=\text{kron}(V_{azi},V_{elj})$ where $V_{ij}$ is a column vector where the first $N_{el}$ entries correspond to the antennas in the first column, the second $N_{el}$ entries correspond to the antennas in the second column, and so on. Often in MU-MIMO transmission, the actual final precoding vector that the eNB uses to transmit to the UE during MU-MIMO transmission is actually a function of the previously mentioned "final precoding vector".

For 2D XP arrays, the product codebook framework can become a little more complicated because there may be an ambiguity with regard to how to handle the polarization aspect of the product codebook. This ambiguity is the result of four ways in which the polarization can be handled when aggregating the azimuth and elevation dimensions separately. The eNB can perform some form of antenna aggregation of the azimuth dimension to form elevation ports over which CSI-RS is transmitted that enables the UE to compute elevation PMI. Similarly, the eNB can perform some form of antenna aggregation of the elevation dimension to form azimuth ports over which CSI-RS is transmitted that enables the UE to compute azimuth PMI. The antenna aggregation can be performed by different methodologies (for example, cyclic shift diversity, random precoding, etc.). The four ways of handling polarization in the aggregation process can result from four different ways regarding which dimension(s) retain(s) polarization after the aggregation is performed. Each dimension can either retain polarization in the aggregation process or each dimension can absorb (i.e., not retain) polarization in the aggregation process.

Figure 6:
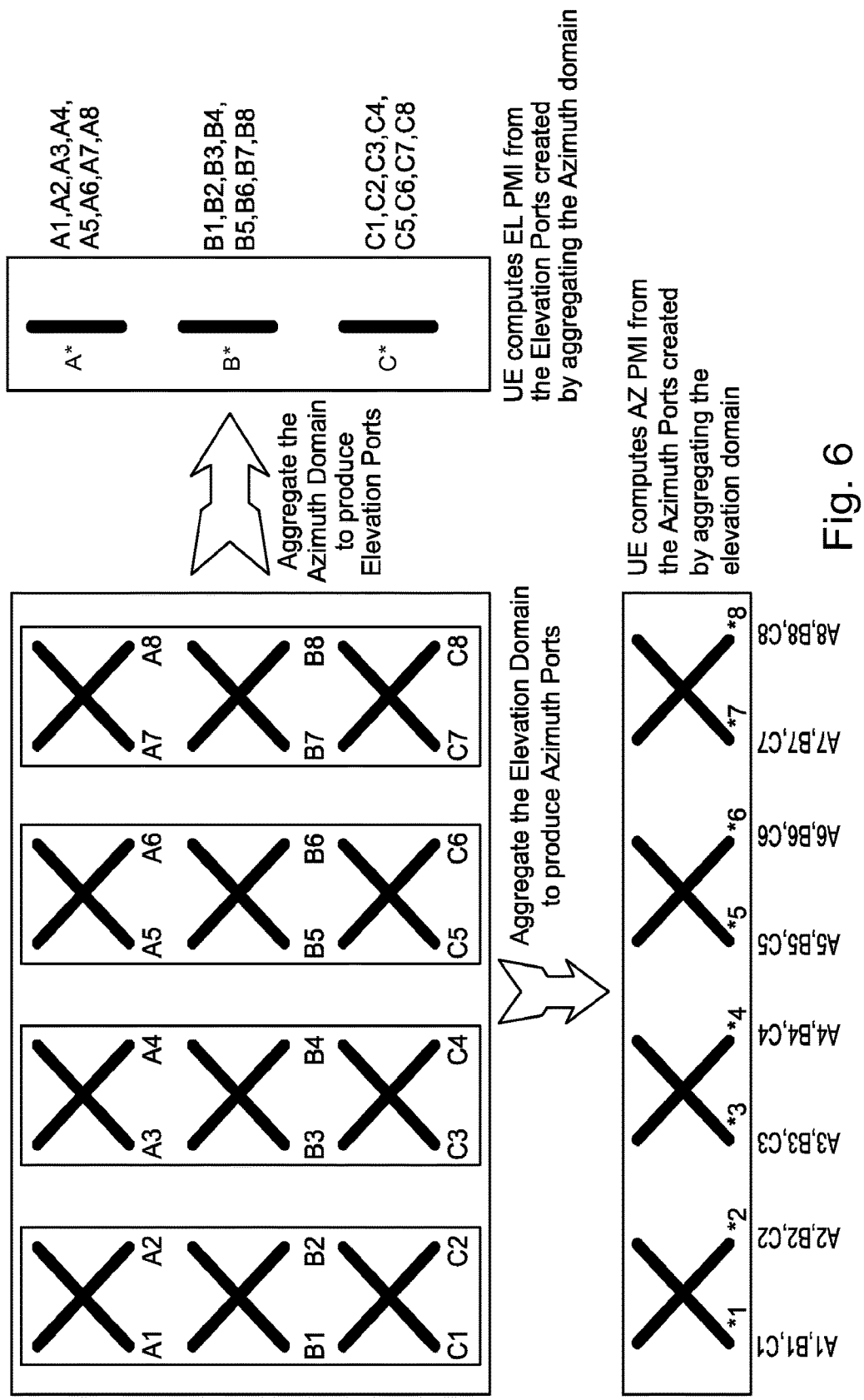
FIG. 6 illustrates an aggregation methodology where the azimuth dimension retains polarization after aggregation.
Figure 7:
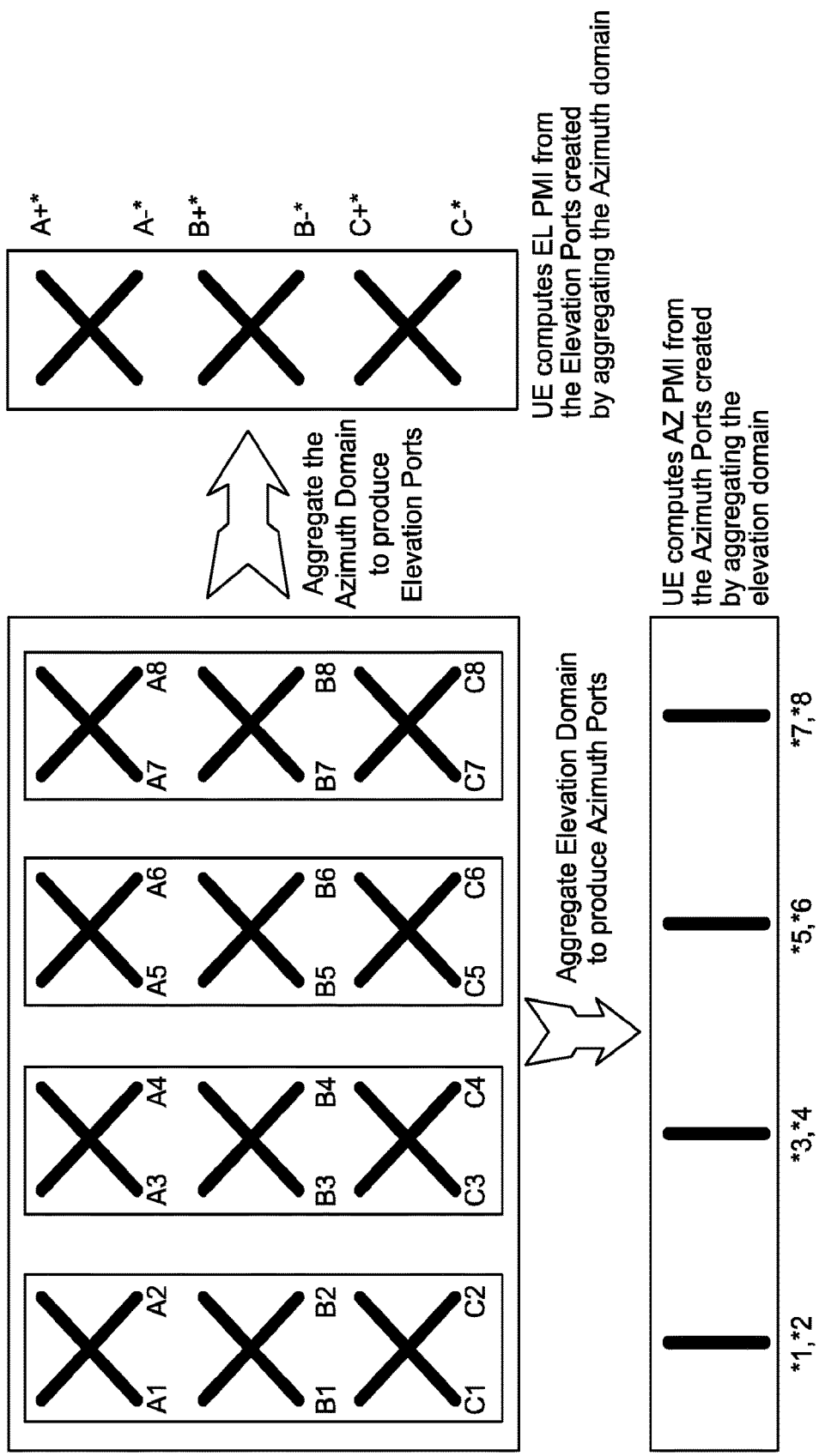
FIG. 7 illustrates an aggregation methodology where the elevation dimension retains polarization after aggregation.
Figure 8:
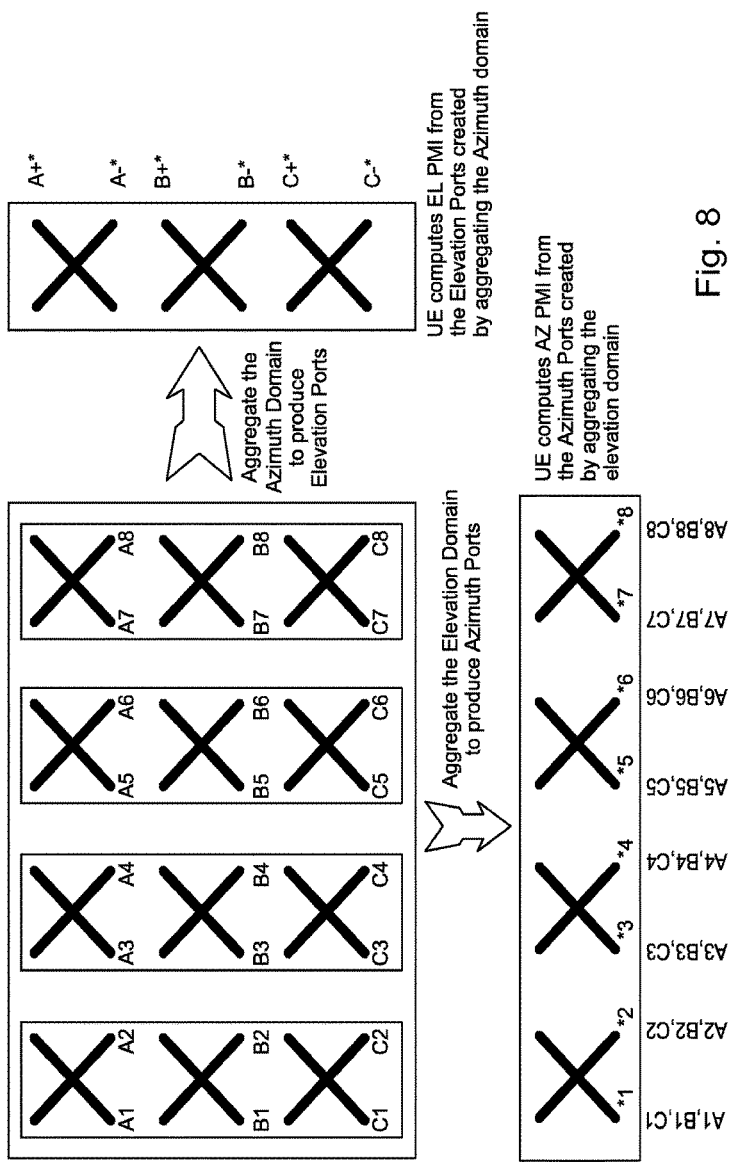
FIG. 8 illustrates an aggregation methodology where both dimensions retain polarization after aggregation.
Figure 9:
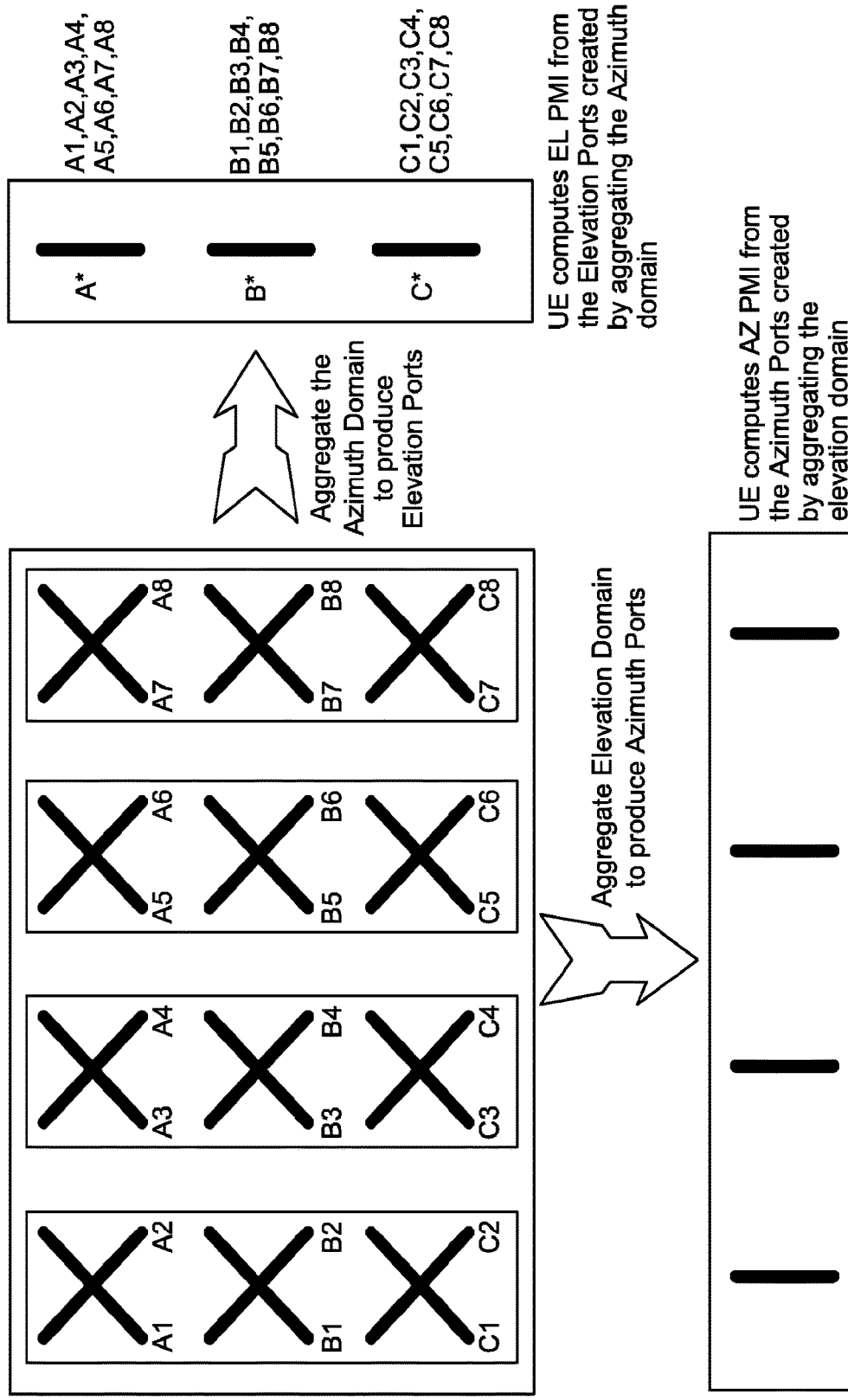
FIG. 9 illustrates an aggregation methodology where neither dimension retains polarization after aggregation.

These four ways are shown in FIG. 6 (where the azimuth dimension retains polarization after aggregation), FIG. 7 (where the elevation dimension retains polarization after aggregation), FIG. 8 (where both dimensions retain polarization after aggregation), and FIG. 9 (where neither dimension retains polarization after aggregation). Each aggregation methodology may have direct implications on the nature (e.g., dimension) of the codebooks that would be used for the azimuth and elevation dimensions. These implications are summarized below.

With the aggregation strategy shown in FIG. 6, the azimuth dimension retains polarization after aggregation. For aggregating the vertical dimension to produce azimuth ports, in each column, the plus 45 elements are aggregated together and the minus 45 elements are aggregated together to effectively form cross-pol ports in the azimuth dimension. As a result, the azimuth codebook for the product codebook must support a cross pol array having a number of antennas equal to twice the number of columns ($N_{col}$) in the array. For aggregating the horizontal dimension to produce elevation ports, in each row, both polarizations are aggregated together to effectively form a single port for each row. As a result, the elevation codebook for the product codebook would support a ULA having a number of antennas equal to the number of rows ($N_{row}$) in the array. The XP azimuth PMI is applied to every row of the array to form a number of beams equal to the number of rows of the array, and the elevation PMI is applied across these beams to form the final beam to the UE. In this framework, the codebook for the azimuth PMI and the elevation PMI are given by:

$$C_{2D\_xp\_az}=\text{kron}(G,F(N_{col},\Delta_{az})) \text{ and } C_{2D\_xp\_el}=F(N_{row},\Delta_{el})$$

Similar to the 2D-ULA case, when the UE selects the $i^{th}$ azimuth codebook vector $V_{azi}$ and the $j^{th}$ elevation code vector $V_{elj}$, the final precoding vector is computed to be $V_{ij}=\text{kron}(V_{azi},V_{elj})$ where $V_{ij}$ is a column vector where the first $N_{el}$ entries correspond to the antennas in the first column, and the second $N_{el}$ entries correspond to the antennas in the second column, and so on. Often, in MU-MIMO transmission, the actual final precoding vector that the eNB uses to transmit to the UE during MU-MIMO transmission is actually a function of the previously mentioned "final precoding vector" (e.g., the actual final precoding vector may be computed according to a zero-forcing criteria based on the previously mentioned "final precoding vector").

With the aggregation strategy shown in FIG. 7, the elevation dimension retains polarization after aggregation. For aggregating the vertical dimension to produce azimuth ports, in each column, the plus 45 elements and the minus 45 elements are aggregated together to effectively form a single azimuth port for each column of the array. As a result, the azimuth codebook for the product codebook would support a ULA having a number of antennas equal to the number of columns in the array. For aggregating the horizontal dimension to produce elevation ports, in each row, the plus 45 elements are aggregated together and the minus 45 elements are aggregated together to effectively form a cross pol port for each row of the array. As a result, the elevation codebook for the product codebook would support a cross-pol array having a number of antennas equal to twice the number of rows in the array. The XP elevation PMI can be applied to every column of the array to form a number of beams equal to the number of columns of the array, and the azimuth PMI is applied across these beams to form the final beam to the UE.

$$C_{2D\_xp\_az}=F(N_{col},\Delta_{az}) \text{ and } C_{2D\_xp\_el}=\text{kron}(G,F(N_{row},\Delta_{el}))$$

Similar to the previous 2D-XP case, when the UE selects the $i^{th}$ azimuth codebook vector $V_{azi}$ and the $j^{th}$ elevation code vector $V_{elj}$, the final precoding vector can be computed to be $V_{ij}=\text{kron}(V_{azi},V_{elj})$ where $V_{ij}$ is a column vector where the first $N_{el}$ entries correspond to the −45 antennas in the first column, the second $N_{el}$ entries correspond to the +45 antennas in the first column, and so on. As before, often in MU-MIMO transmission, the actual final precoding vector that the eNB uses to transmit to the UE during MU-MIMO transmission is actually a function of the previously mentioned "final precoding vector".

With the aggregation strategy shown in FIG. 8, where both dimensions retain polarization after aggregation, for aggregating the vertical dimension to produce azimuth ports, in each column, the plus 45 elements are aggregated together, and the minus 45 elements are aggregated together to effectively form cross-pol ports in the azimuth dimension. As a result, the azimuth codebook for the product codebook would support a cross pol array having a number of antennas equal to twice the number of columns in the array. For aggregating the horizontal dimension to produce elevation ports, in each row, the plus 45 elements are aggregated together and the minus 45 elements are aggregated together to effectively form a cross pol port for each row of the array. As a result, the elevation codebook for the product codebook would support a cross-pol array having a number of antennas equal to twice the number of rows in the array. There are two ways to apply the azimuth and elevation PMI. In the first way, the azimuth XP PMI can be applied to each row of the array, but then the −45 portion of the elevation PMI would be applied to the −45 elements of each column while the +45 portion of the elevation PMI would be applied to the +45 elements of each column. The second way is identical to the first way except that the roles of elevation and azimuth are reversed.

$$C_{2D\_xp\_az}=\text{kron}(G,F(N_{col},\Delta_{az})) \text{ and } C_{2D\_xp\_el}=\text{kron}(G,F(N_{row},\Delta_{el}))$$

With the aggregation strategy shown in FIG. 9, where neither dimension retains polarization after aggregation, for aggregating the vertical dimension to produce azimuth ports, in each column, the plus 45 elements and the minus 45 elements are aggregated together to effectively form a single azimuth port for each column of the array. As a result, the azimuth codebook for the product codebook would support a ULA having a number of antennas equal to the number of columns in the array. For aggregating the horizontal dimension to produce elevation ports, in each row, both polarizations are aggregated together to form effectively form a single port for each row. As a result, the elevation codebook for the product codebook would support a ULA having a number of antennas equal to the number of rows in the array.

With regard to the signaling methodology required to support the codebook construction framework described above, a simple signaling methodology can be used for enabling the use of arbitrarily-sized 2D arrays for massive MIMO. The following information would need to be signaled to the UE. The information may comprise an array type, azimuth/horizontal information, elevation/vertical information, and/or a cross-pol type. With regard to array type, the types can comprise a 2D Uniform Linear Vertical Array and/or a 2D Cross Pol array. With regard to azimuth/horizontal information, the information can indicate a number of antenna ports in the azimuth dimension. For a 2D cross-pol array, it may be assumed that the number of antennas in the horizontal/azimuth dimension is twice the number of physical columns in the array. The number of columns in the array could be signaled rather than the number of antennas in the horizontal dimension. The azimuth/horizontal information can also indicate a step size in the DFT construction. This parameter could simply be specified ahead of time in the standard rather than communicated over the air to the UE.

With regard to elevation/vertical information, the information can indicate a number of antenna ports in the elevation dimension. The elevation/vertical information can also comprise a step size in the DFT construction. This parameter could simply be specified ahead of time in the standard rather than communicated over the air to the UE.

With regard to a cross-pol type, for Cross-pol arrays, the cross-pol type indicates how the polarization is handled in the aggregation of the ports for transmitting CSI-RS for azimuth and CSI-RS for elevation. This will enable the UE to determine which array type (cross-pol versus ULA, as described above) the codebook needs to support for each dimension. This indicator will tell the UE whether the method in FIG. 6 or whether the method in FIG. 7 or whether the method in FIG. 8 or whether the method in FIG. 9 is being used by the eNB, which will determine the size of the DFT codebook to be used on each dimension (as described above).

Some of these indicators can be combined into one indicator. For example, two bits could be used to signal both the Array Type and the Cross-pol type (for example: 00=2D-ULA, 10=2D-XP using FIG. 6, 11=2D-XP using FIG. 7, 01=2D-XP using FIG. 8).

From the above parameters that are signaled to the UE, the UE will be able to determine the dimensions of the azimuth CSI-RS and the corresponding azimuth codebook dimension, the dimensions of the elevation CSI-RS, and the corresponding elevation codebook dimension. Without the cross-pol type, there may be ambiguity regarding the dimensions of the azimuth/elevation codebooks for the indicated number of azimuth and elevation antennas in the eNB array depending on whether the method for FIG. 6 is being used or whether the method in FIG. 7 is being used by the eNB.

A variation of the above is for the standard to specify a set of predefined choices for the settings of these parameters, in which case the UE would be informed of which predefined choice is being used. Regardless of whether there is a set of predefined choices or whether the UE calculates the codebooks on the fly, the ambiguity solved by specifying the cross-pol type may still need to be part of the solution. The codebooks for the azimuth and elevation dimensions would be indicated to the UE based on the number of azimuth and elevation antennas and the cross-pol type, so a solution where there are pre-computed codebooks (rather than the UE calculating the codebooks on the fly) is still provided by embodiments of the invention. In that solution, there may be a set of pre-computed codebooks that apply to either the elevation dimension or the azimuth dimension (based on the 1D construction described above). The UE would be signaled the number of azimuth/elevation antennas and cross-pol type, which would enable the UE to determine which codebook to use for each dimension and the number of ports for the CSI-RS of each dimension.

Finally, for the case where the UE calculates the codebook on the fly, some round-off functionality may need to be specified ahead of time to make sure that both the eNB and the UE create the same codebooks from the specified calculations that are based on the parameters being signaled to the UE.

In one embodiment, the codebook construction, as described above, may be based on DFT vectors, which had the advantage of allowing codebooks to be defined without considering the spacing between antenna elements. An alternative embodiment can be derived where the codebook entries are based on a set of array manifold vectors spaced by some angular step size to cover the visible angular region. The signaling methodology described above for indicating, to the UE, the codebooks being used in elevation and azimuth can easily be extended to this alternative array-manifold-based method for constructing the codebook entries. In this alternative embodiment, signaling the number of antennas in each dimension plus a step size would be handled similarly to what was described for the DFT-based embodiment, except that the UE would also need to know the assumed array element spacing for the array manifold vectors (preferably measured in wavelengths). Using the array-manifold-based codebook construction rather than the DFT-based codebook construction means an additional parameter (such as an antenna element spacing) would need to be specified, assumed, or signaled, but the signaling to the UE of the codebooks to be used (based on a number of antennas and the cross-pol type parameter) would be the same/similar. The array manifold approach enables the extension of the flexible codebook signaling to include arrays types other than uniform linear arrays or uniform spacing along a line of cross-pol antennas. For example, a uniform circular array with M columns of elements uniformly spaced on a circle of radius r where each column contains N elevation antennas. In this case, the signaling to the UE could include the abovementioned angles along with the radius of the circular array.

Similar to how the array manifold vectors can be sampled so the covered angular range is limited, the DFT vectors can also be sampled in such a way to limit the angular range scanned by the codebooks. For example, for a 1D ULA, rank 1 codebooks are constructed based on a subset of DFT vectors as follows. Consider a matrix F having dimension N by N/Δ−2q, where the (n,m)$^{th}$ element of F is given by:

$$F_{n,m}(N, \Delta) = e^{-j\frac{2\pi}{N}nm\Delta}$$
$$n = 0, 1, \ldots N - 1, m = q - 0.5(N/\Delta),$$
$$q - 0.5(N/\Delta) + 1, \ldots, 0.5(N/\Delta) - q - 1$$

where Δ is a step size and q is a limiter. For example if N=8, Δ=0.2, and q=4, then the number of codebook vectors is (N/Δ)−2q=32 instead of (N/Δ)=40 and the scanning range is reduced by eliminating the 2q=8 vectors which point the furthest from an angle of zero degrees.

Note also that the DFT vectors, as defined, always contain a vector which points towards the angle of zero degrees (i.e., broadside to the array). In some embodiments including the zero angle may not be desirable, so the DFT vectors may be shifted by some angular amount so that they do not contain a vector pointed spatially to the zero angle. For example, a shift can be used to make the two DFT vectors which spatially point closest to zero degrees be pointed to angles equally spaced on each side of the zero angle.

Embodiments of the present invention enable the flexible specification of arbitrary-dimension codebooks based on DFT vectors for 2D arrays. Embodiments of the present invention enable arbitrary array sizes in elevation and azimuth. The codebook to be used by the eNB and the UE can be calculated on the fly based on a small set of parameters that are signaled to the UE (array type and number of antennas in azimuth and elevation). As a result, operators can deploy massive MIMO arrays with sizes tailored to their specific deployment scenarios.

The signaling methodology accounts for both linear vertically-polarized arrays and cross-polarized arrays. As described above, the signaling methodology handles the ambiguity that results when specifying product codebooks for 2D cross-pol arrays.

Embodiments of the present invention can also apply to the case where the UE stores a set of codebooks that are identified by (or based on) these parameters: number of antennas, DFT step size, and cross-pol type. The result is that the UEs could be deployed with pre-computed codebooks for a given dimension (elevation/azimuth), and the UE is told the number of antennas for each dimension and the overall cross pol type. Those parameters would tell the UE what it needs to know regarding the product codebook methodology (azimuth and elevation codebooks and number of ports for the CSI-RS in each dimension).

Figure 10:
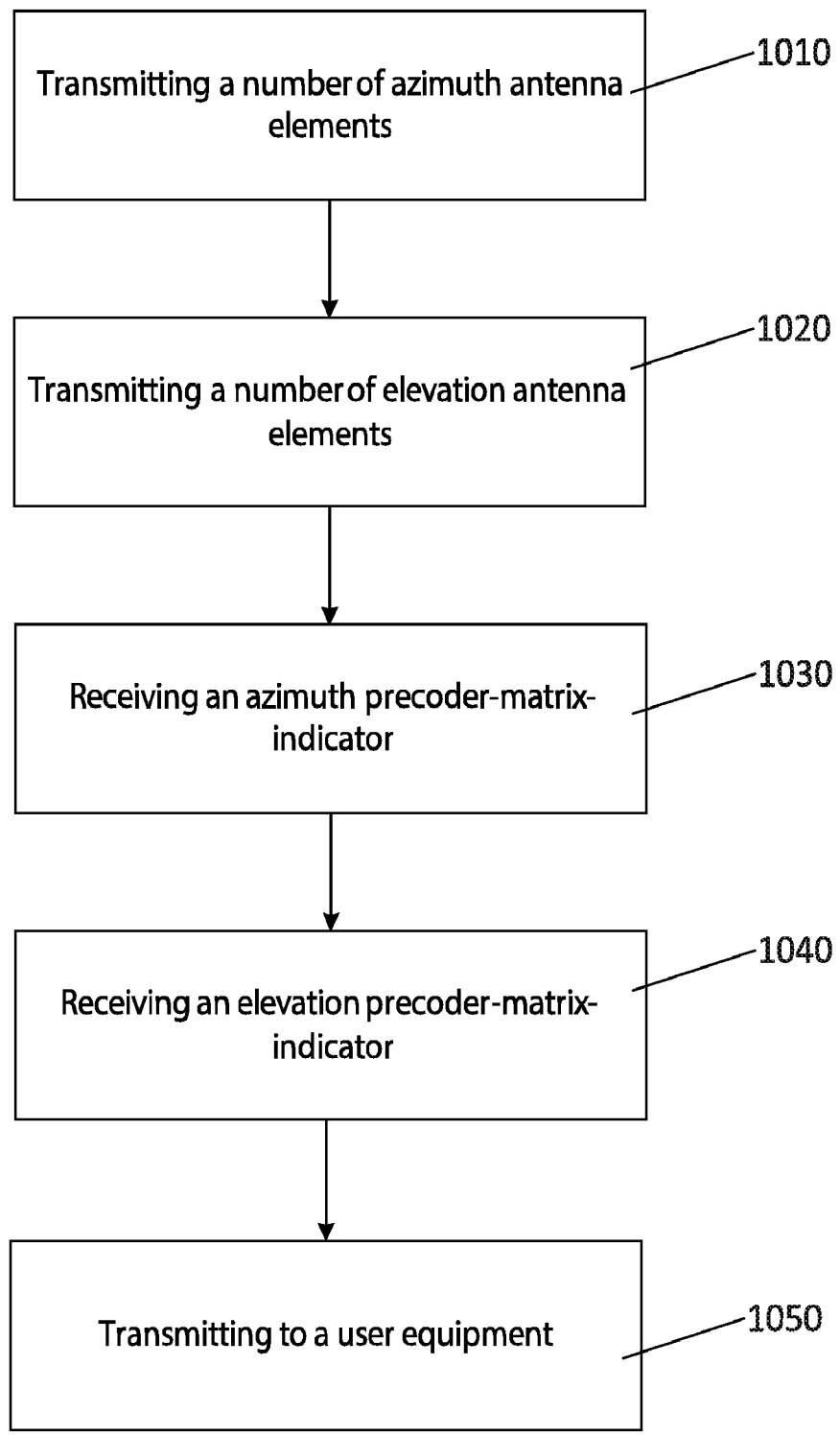
FIG. 10 illustrates a flowchart of a method in accordance with embodiments of the invention.

FIG. 10 illustrates a flowchart of a method in accordance with embodiments of the invention. The method illustrated in FIG. 10 comprises, at 1010, transmitting, by a network entity, a number of azimuth antenna elements. The method also comprises, at 1020, transmitting a number of elevation antenna elements. The method also comprises, at 1030, receiving an azimuth precoder-matrix-indicator. The method also comprises, at 1040, receiving an elevation precoder-matrix-indicator. The method also comprises, at 1050, transmitting, for example, to a user equipment, based on the received azimuth precoder-matrix-indicator and the received elevation precoder-matrix-indicator.

Figure 11:
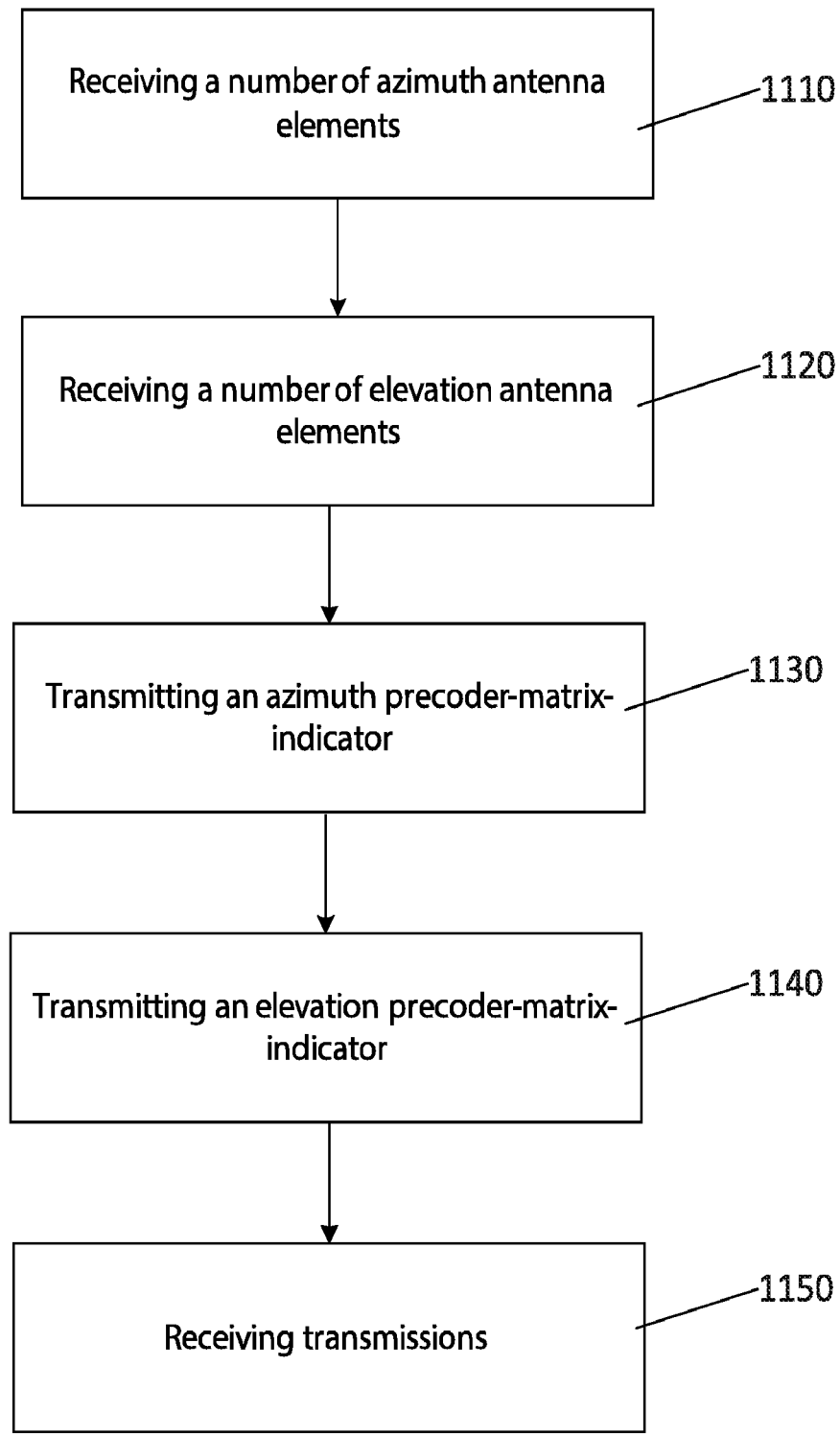
FIG. 11 illustrates a flowchart of a method in accordance with embodiments of the invention.

FIG. 11 illustrates a flowchart of a method in accordance with embodiments of the invention. The method illustrated in FIG. 11 comprises, at 1110, receiving, for example, by a user equipment or a relay, a number of azimuth antenna elements. The method also comprises, at 1120, receiving a number of elevation antenna elements. The method also comprises, at 1130, transmitting an azimuth precoder-matrix-indicator. The method also comprises, at 1140, transmitting an elevation precoder-matrix-indicator. The method also comprises, at 1150, receiving transmissions based on the transmitted azimuth precoder-matrix-indicator and the transmitted elevation precoder-matrix-indicator.

Figure 12:
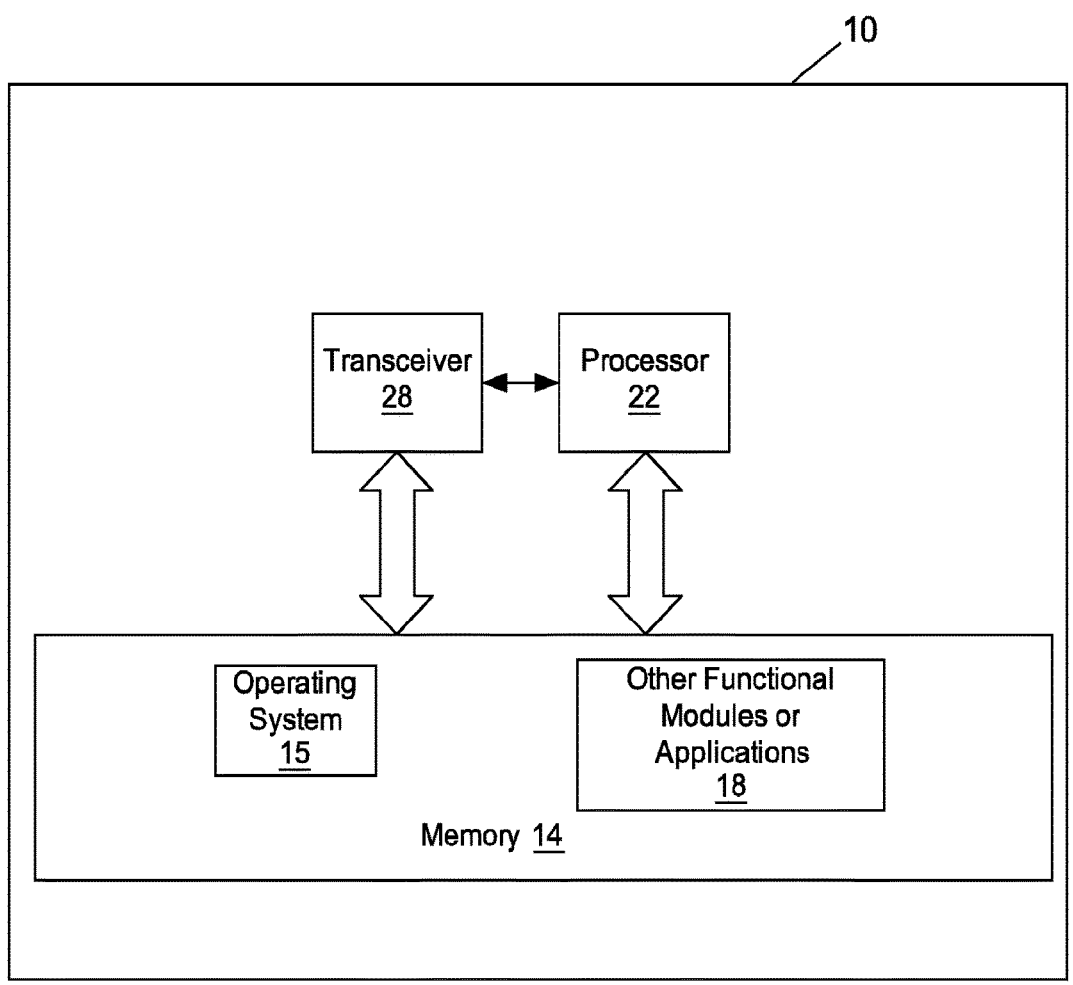
FIG. 12 illustrates an apparatus in accordance with embodiments of the invention.

FIG. 12 illustrates an apparatus in accordance with embodiments of the invention. In one embodiment, the apparatus can be a network entity such as an evolved Node B/base station. In another embodiment, the apparatus can be a user equipment or a relay. The user equipment can be a mobile device and/or a mobile phone, for example. Apparatus 10 can comprise a processor 22 for processing information and executing instructions or operations. Processor 22 can be any type of general or specific purpose processor. While a single processor 22 is shown in FIG. 12, multiple processors can be utilized according to other embodiments. Processor 22 can also comprise one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further comprise a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. Memory 14 can comprise any combination of random access memory (RAM), read only memory (ROM), static storage such as a magnetic or optical disk, or any other type of non-transitory machine or computer readable media. The instructions stored in memory 14 can comprise program instructions or computer program code that, when executed by processor 22, enable the apparatus 10 to perform tasks as described herein.

Apparatus 10 can also comprise one or more antennas (not shown) for transmitting and receiving signals and/or data to and from apparatus 10. Apparatus 10 can further comprise a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can comprise an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 13:
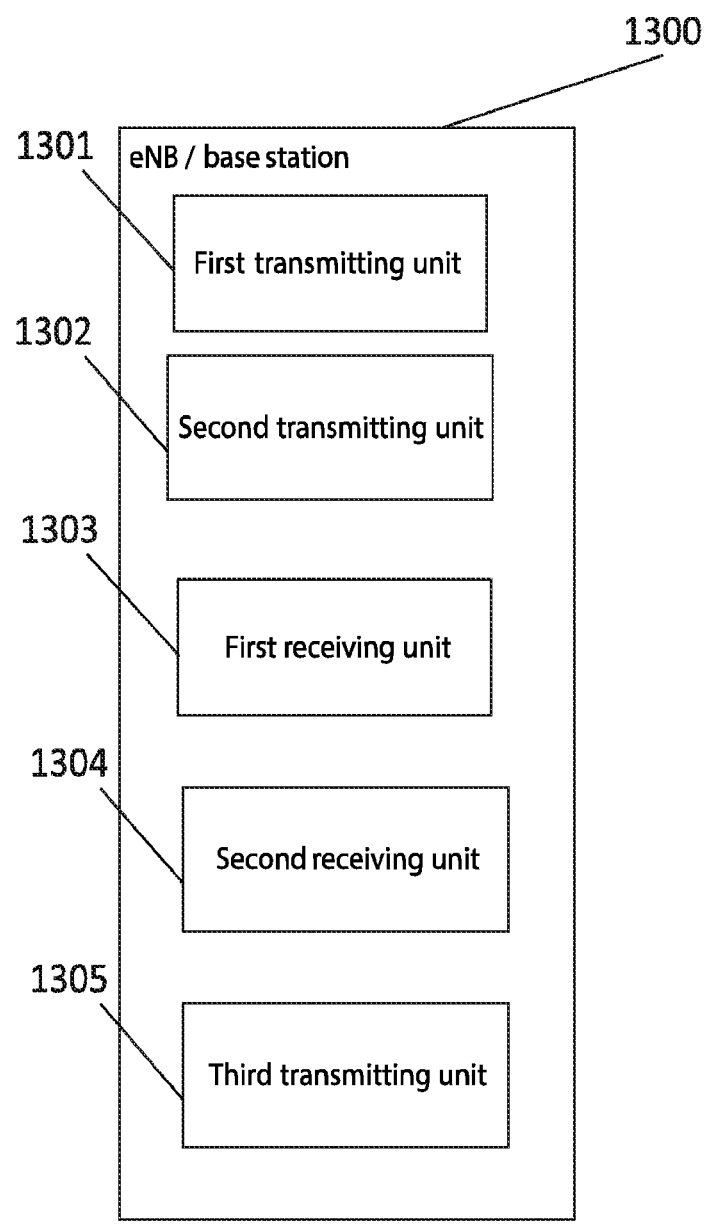
FIG. 13 illustrates an apparatus in accordance with embodiments of the invention.

FIG. 13 illustrates an apparatus in accordance with embodiments of the invention. Apparatus 1300 can be an eNB/base station, a relay, an access point, for example. Apparatus 1300 can comprise a first transmitting unit 1301 that transmits a number of azimuth antenna elements. Apparatus 1300 can also comprise a second transmitting unit 1302 that transmits a number of elevation antenna elements. Apparatus 1300 can also comprise a first receiving unit 1303 that receives an azimuth precoder-matrix-indicator. Apparatus 1300 can also comprise a second receiving unit 1304 that receives an elevation precoder-matrix-indicator. Apparatus 1300 can also comprise a third transmitting unit 1305 that transmits, for example, to a user equipment based on the received azimuth precoder-matrix-indicator and the received elevation precoder-matrix-indicator. In one embodiment, the first transmitting unit, the second transmitting unit, and the third transmitting unit can be a same transmitting unit. In one embodiment, the first receiving unit and the second receiving unit can be a same receiving unit.

Figure 14:
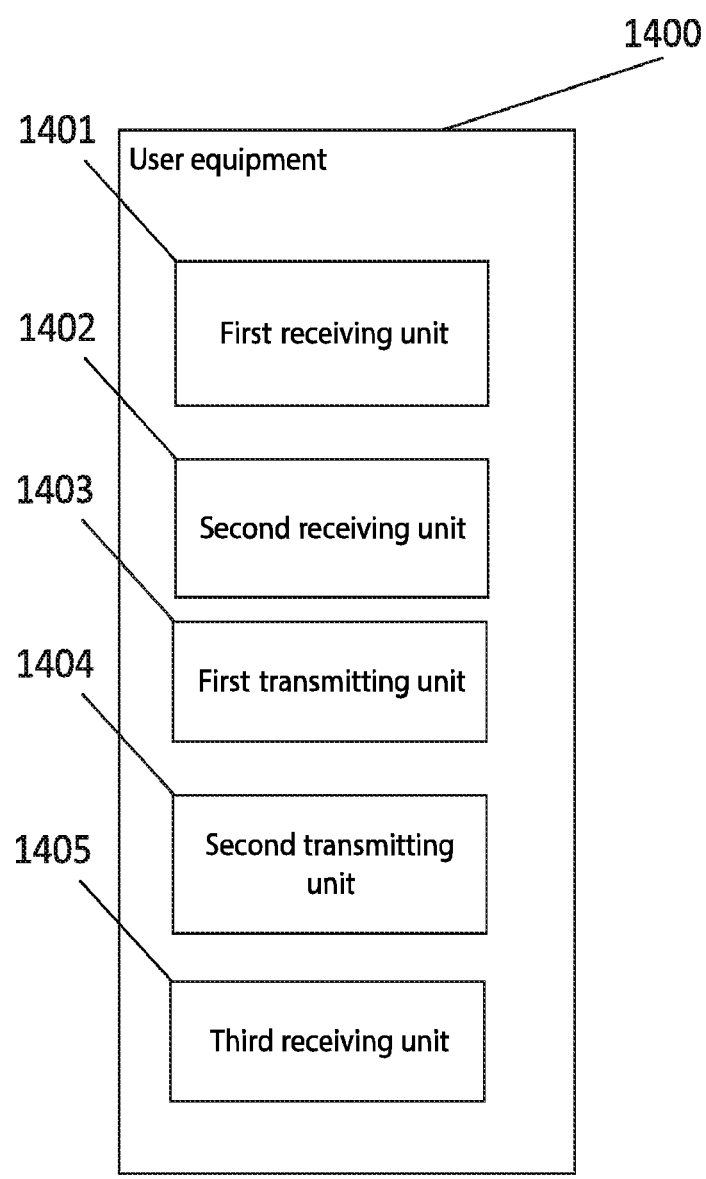
FIG. 14 illustrates an apparatus in accordance with embodiments of the invention.

FIG. 14 illustrates an apparatus in accordance with embodiments of the invention. Apparatus 1400 can be a user equipment, a relay, a base station, and/or an access point, for example. Apparatus 1400 can comprise a first receiving unit 1401 that receives a number of azimuth antenna elements. Apparatus 1400 can also comprise a second receiving unit 1402 that receives a number of elevation antenna elements. Apparatus 1400 can also comprise a first transmitting unit 1403 that transmits an azimuth precoder-matrix-indicator. Apparatus 1400 can also comprise a second transmitting unit 1404 that transmits an elevation precoder-matrix-indicator. Apparatus 1400 can also comprise a third receiving unit 1405 that receives transmissions based on the transmitted azimuth precoder-matrix-indicator and the transmitted elevation precoder-matrix-indicator. In one embodiment, the first receiving unit, the second receiving unit, and the third receiving unit can be a same receiving unit. In one embodiment, the first transmitting unit and the second transmitting unit can be a same transmitting unit.

Figure 15:
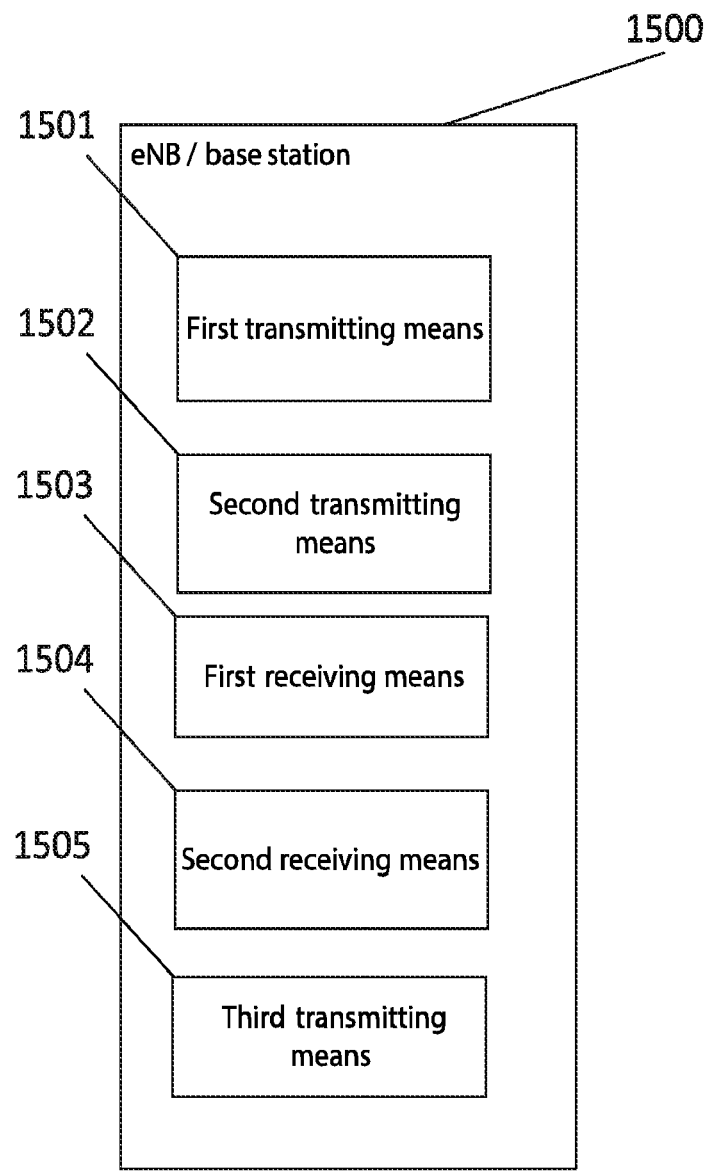
FIG. 15 illustrates an apparatus in accordance with embodiments of the invention.

FIG. 15 illustrates an apparatus in accordance with embodiments of the invention. Apparatus 1500 can be an eNB/base station, for example. Apparatus 1500 can comprise a first transmitting means 1501 for transmitting a number of azimuth antenna elements. Apparatus 1500 can also comprise a second transmitting means 1502 for transmitting a number of elevation antenna elements. Apparatus 1500 can also comprise a first receiving means 1503 for receiving an azimuth precoder-matrix-indicator. Apparatus 1500 can also comprise a second receiving means 1504 for receiving an elevation precoder-matrix-indicator. Apparatus 1500 can also comprise a third transmitting means 1505 for transmitting, for example to a user equipment, based on the received azimuth precoder-matrix-indicator and the received elevation precoder-matrix-indicator.

Figure 16:
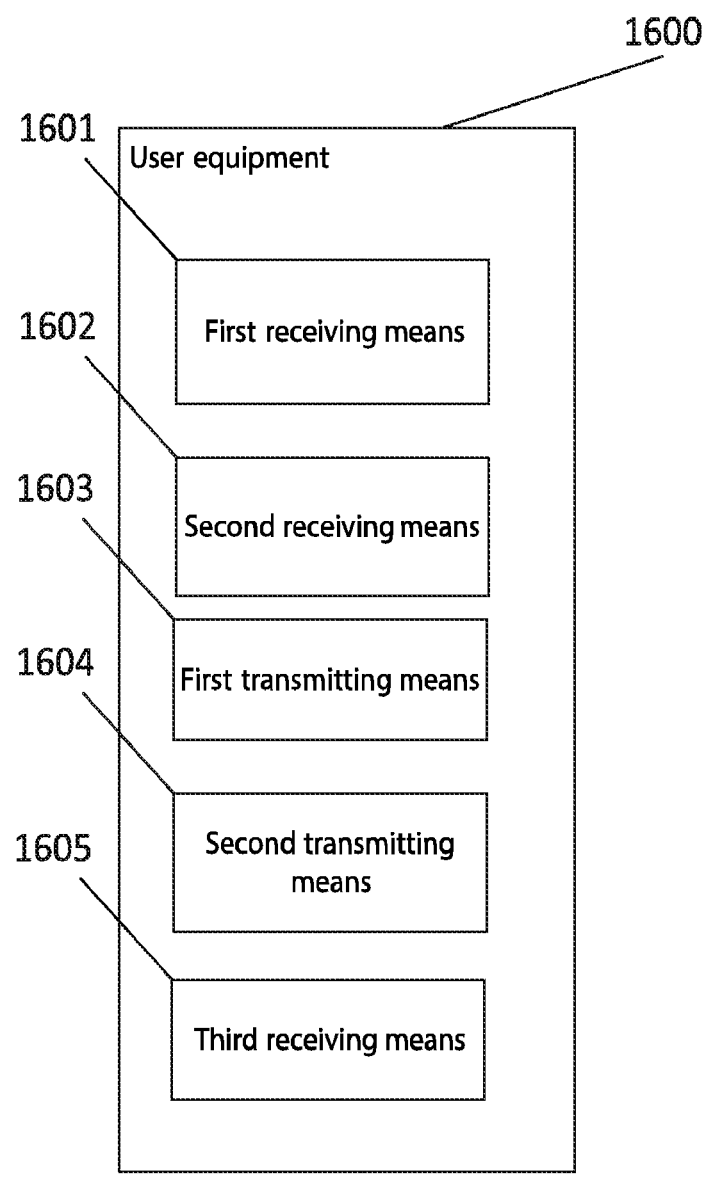
FIG. 16 illustrates an apparatus in accordance with embodiments of the invention.

FIG. 16 illustrates an apparatus in accordance with embodiments of the invention. Apparatus 1600 can be a user equipment, a relay, a base station, and/or an access point, for example. Apparatus 1600 can comprise a first receiving means 1601 for receiving a number of azimuth antenna elements. Apparatus 1600 can also comprise a second receiving means 1602 for receiving a number of elevation antenna elements. Apparatus 1600 can also comprise a first transmitting means 1603 for transmitting an azimuth precoder-matrix-indicator. Apparatus 1600 can also comprise a second transmitting means 1604 for transmitting an elevation precoder-matrix-indicator. Apparatus 1600 can also comprise a third receiving means 1605 for receiving transmissions based on the transmitted azimuth precoder-matrix-indicator and the transmitted elevation precoder-matrix-indicator.

Figure 17:
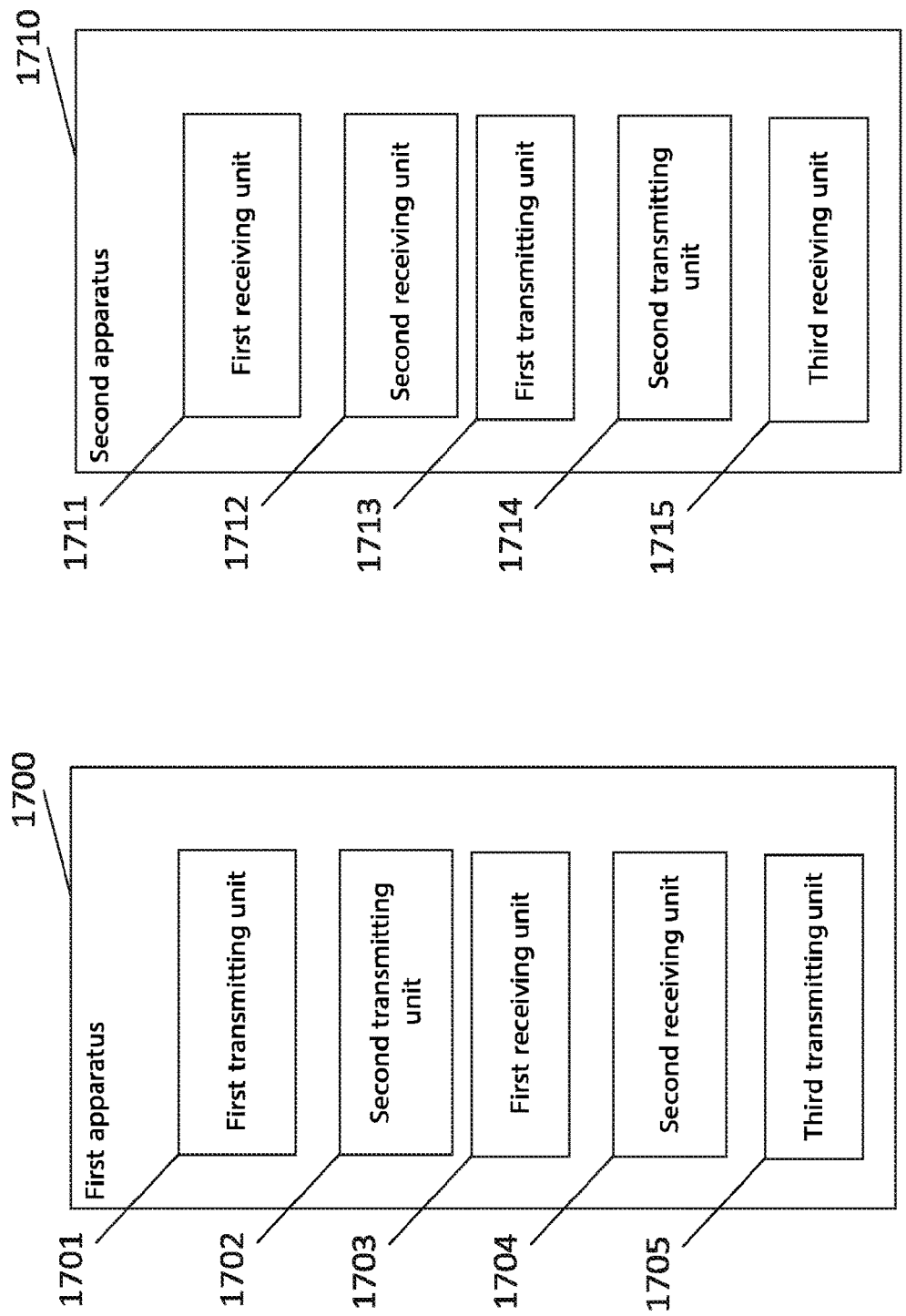
FIG. 17 illustrates a system in accordance with an embodiment of the invention.

FIG. 17 illustrates a system in accordance with an embodiment of the invention. The system can include a first apparatus 1700 that can comprise a first transmitting unit 1701 that transmits a number of azimuth antenna elements. First apparatus 1700 can also comprise a second transmitting unit 1702 that transmits a number of elevation antenna elements. First apparatus 1700 can also comprise a first receiving unit 1703 that receives an azimuth precoder-matrix-indicator. First apparatus 1700 can also comprise a second receiving unit 1704 that receives an elevation precoder-matrix-indicator. First apparatus 1700 can also comprise a third transmitting unit 1705 that transmits based on the received azimuth precoder-matrix-indicator and the received elevation precoder-matrix-indicator. The system also includes a second apparatus 1710. Second apparatus 1710 can comprise a first receiving unit 1711 that receives the number of azimuth antenna elements. Second apparatus 1710 can also comprise a second receiving unit 1712 that receives the number of elevation antenna elements. Second apparatus 1710 can also comprise a first transmitting unit 1713 that transmits the azimuth precoder-matrix-indicator. Second apparatus 1710 can also comprise a second transmitting unit 1714 that transmits the elevation precoder-matrix-indicator. Second apparatus 1710 can also comprise a third receiving unit 1715 that receives transmissions based on the transmitted azimuth precoder-matrix-indicator and the transmitted elevation precoder-matrix-indicator.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
    transmitting, by a network entity, a number of azimuth antenna elements;
    transmitting a number of elevation antenna elements;
    transmitting a cross-polarization type indicating for each of azimuth and elevation dimensions whether the dimension retains polarization at an aggregation of corresponding antenna elements in a transmission of a corresponding channel state information reference signal (CSI-RS);
    receiving an azimuth precoder-matrix-indicator;
    receiving an elevation precoder-matrix-indicator; and
    transmitting based on the received azimuth precoder-matrix-indicator and the received elevation precoder-matrix-indicator,
    wherein the receiving the azimuth precoder-matrix-indicator comprises receiving an azimuth precoder-matrix-indicator based on an azimuth codebook, the receiving the elevation precoder-matrix-indicator comprises receiving an elevation precoder-matrix-indicator based on an elevation codebook, the azimuth codebook is based on the number of azimuth antenna elements, and the elevation codebook is based on the number of elevation antenna elements.

2. The method according to claim 1, wherein the azimuth codebook is further based on a first step size, and the elevation codebook is further based on a second step size.

3. The method according to claim 1, further comprising transmitting an array type, wherein the azimuth codebook and the elevation codebook are based on the array type.

4. The method according to claim 1, wherein at least one of:
    the azimuth codebook is based on discrete-fourier-transform (DFT) vectors of a dimension specified by the transmitted number of azimuth antenna elements and based on a first DFT step size; and
    the elevation codebook is based on discrete-fourier transform (DFT) vectors having a dimension based on a number of elevation antenna elements and based on a second DFT step size.

5. The method according to claim 1, wherein at least one of:
    the azimuth codebook is based on a combination of a two-element codebook and discrete-fourier-transform vectors having a dimension based on the transmitted number of azimuth antenna elements; and
    the elevation codebook is based on a combination of a two-element codebook and discrete-fourier-transform vectors having a dimension based on the transmitted number of elevation antenna elements.

6. A method, comprising:
    receiving, by a network element, a number of azimuth antenna elements;
    receiving a number of elevation antenna elements;
    receiving a cross-polarization type indicating for each of azimuth and elevation dimensions whether the dimension retains polarization at an aggregation of corresponding antenna elements in a transmission of a corresponding channel state information reference signal (CSI-RS);
    determining an azimuth codebook based on the received number of azimuth antenna elements and the indicated cross-polarization type regarding the azimuth dimension;
    determining an elevation codebook based on the received number of elevation antenna elements and the indicated cross-polarization type regarding the elevation dimension;
    transmitting an azimuth precoder-matrix-indicator, wherein the azimuth precoder-matrix-indicator is based on the azimuth codebook;
    transmitting an elevation precoder-matrix-indicator, wherein the elevation precoder-matrix-indicator is based on the elevation codebook; and
    receiving transmissions based on the transmitted azimuth precoder-matrix-indicator and the transmitted elevation precoder-matrix-indicator.

7. The method according to claim 6, further comprising determining an azimuth codebook based on the received number of azimuth antenna elements and a first step size, and determining an elevation codebook based on the received number of elevation antenna elements and a second step size, wherein the azimuth precoder-matrix-indicator is based on the azimuth codebook, and the elevation precoder-matrix-indicator is based on the elevation codebook.

8. The method according to claim 6, further comprising receiving an array type, wherein the azimuth codebook and the elevation codebook are based on the array type.

9. The method according to claim 6, wherein at least one of:
    the azimuth codebook is based on discrete-fourier-transform (DFT) vectors of a dimension specified by the transmitted number of azimuth antenna elements and based on a first DFT step size; and
    the elevation codebook is based on discrete-fourier transform (DFT) vectors having a dimension based on a number of elevation antenna elements and based on a second DFT step size.

10. The method according to claim 6, wherein at least one of:
    the azimuth codebook is based on a combination of a two-element codebook and discrete-fourier-transform vectors having a dimension based on the received number of azimuth antenna elements; and
    the elevation codebook is based on a combination of a two-element codebook and discrete-fourier-transform vectors having a dimension based on the received number of elevation antenna elements.

11. An apparatus, comprising:
    at least one processor; and
    at least one memory including computer program code,
    the at least one memory and the computer program code configured, with the at least one processor, to cause the apparatus at least to
    receive a number of azimuth antenna elements;
    receive a number of elevation antenna elements;
    receive a cross-polarization type indicating for each of azimuth and elevation dimensions whether the dimension retains polarization at an aggregation of corresponding antenna elements in a transmission of a corresponding channel state information reference signal (CSI-RS);

determine an azimuth codebook based on the received number of azimuth antenna elements and the indicated cross-polarization type regarding the azimuth dimension;

determine an elevation codebook based on the received number of elevation antenna elements and the indicated cross-polarization type regarding the elevation dimension;

transmit an azimuth precoder-matrix-indicator, wherein the azimuth precoder-matrix-indicator is based on the azimuth codebook;

transmit an elevation precoder-matrix-indicator, wherein the elevation precoder-matrix-indicator is based on the elevation codebook; and receive transmissions based on the transmitted azimuth precoder-matrix-indicator and the transmitted elevation precoder-matrix-indicator.

12. The apparatus according to claim 11, wherein the apparatus comprises one of a user equipment and a relay.

13. The apparatus according to claim 11, wherein the apparatus is further caused to determine an azimuth codebook based on the received number of azimuth antenna elements and a first step size, and the apparatus is further caused to determine an elevation codebook based on the received number of elevation antenna elements and a second step size, wherein the azimuth precoder-matrix-indicator is based on the azimuth codebook, and the elevation precoder-matrix-indicator is based on the elevation codebook.

14. The apparatus according to claim 11, wherein the apparatus is further caused to receive an array type, and the azimuth codebook and the elevation codebook are based on the array type.

15. The apparatus according to claim 11, wherein at least one of:
the azimuth codebook is based on discrete-fourier-transform (DFT) vectors of a dimension specified by the transmitted number of azimuth antenna elements and based on a first DFT step size; and
the elevation codebook is based on discrete-fourier transform (DFT) vectors having a dimension based on a number of elevation antenna elements and based on a second DFT step size.

16. The apparatus according to claim 11, wherein at least one of:
the azimuth codebook is based on a combination of a two-element codebook and discrete-fourier-transform vectors having a dimension based on the received number of azimuth antenna elements; and
the elevation codebook is based on a combination of a two-element codebook and discrete-fourier-transform vectors having a dimension based on the received number of elevation antenna elements.

* * * * *